(12) United States Patent
Haas et al.

(10) Patent No.: US 10,346,123 B2
(45) Date of Patent: Jul. 9, 2019

(54) METHOD TO SYNCHRONIZE CONTROL PANELS OF A PRODUCTION SYSTEM

(71) Applicant: Océ Printing Systems GmbH & Co. KG, Poing (DE)

(72) Inventors: Andreas Haas, Armstorf (DE); Harald Keicher, Isen (DE); Norbert Linkel, Isen (DE)

(73) Assignee: Océ Printing Systems GmbH & Co. KG, Poing (DE)

(*) Notice: Subject to any disclaimer, the term of this patent is extended or adjusted under 35 U.S.C. 154(b) by 286 days.

(21) Appl. No.: 15/293,378

(22) Filed: Oct. 14, 2016

(65) Prior Publication Data

US 2017/0109124 A1   Apr. 20, 2017

(30) Foreign Application Priority Data

Oct. 14, 2015   (DE) ........................ 10 2015 117 479

(51) Int. Cl.

| G06F 15/16 | (2006.01) |
| G06F 3/14 | (2006.01) |
| B41J 29/38 | (2006.01) |
| G06F 17/22 | (2006.01) |
| G09G 5/12 | (2006.01) |
| H04L 29/08 | (2006.01) |
| G06F 3/0481 | (2013.01) |
| H04L 29/06 | (2006.01) |

(52) U.S. Cl.
CPC ............ *G06F 3/1462* (2013.01); *B41J 29/38* (2013.01); *G06F 17/2247* (2013.01); *G09G 5/12* (2013.01); *H04L 67/1095* (2013.01); *G06F 3/0481* (2013.01); *G06F 17/2205* (2013.01); *G06F 2203/04803* (2013.01); *H04L 67/42* (2013.01)

(58) Field of Classification Search
CPC ............................. G06F 3/1296; G06F 3/1285
See application file for complete search history.

(56) References Cited

U.S. PATENT DOCUMENTS

| 4,812,842 | A | | 3/1989 | Bayerlein et al. |
| 5,428,730 | A | * | 6/1995 | Baker ..................... G06F 3/033 707/E17.009 |
| 5,933,143 | A | * | 8/1999 | Kobayashi ............ G06T 11/206 715/805 |
| 6,501,929 | B1 | * | 12/2002 | Warbus .................... B41J 3/546 358/1.15 |
| 7,760,767 | B2 | * | 7/2010 | Nilo ..................... H04L 67/1095 370/400 |
| 8,509,656 | B2 | | 8/2013 | Kopp |
| 8,737,885 | B1 | | 5/2014 | Berg |

(Continued)

FOREIGN PATENT DOCUMENTS

| DE | 3614744 C2 | 11/1994 |
| DE | 29720991 U1 | 1/1998 |

(Continued)

*Primary Examiner* — Hieu T Hoang
(74) *Attorney, Agent, or Firm* — Schiff Hardin LLP

(57) ABSTRACT

In a method for synchronizing control panels of a production system (e.g., a printing system), a reference/relationship between respective control panels to be synchronized can be established using a reference table maintained at, for example, a main computer. A synchronized control panel can be synchronized with changes to a synchronizing control panel using the reference table.

21 Claims, 8 Drawing Sheets

(56) References Cited

U.S. PATENT DOCUMENTS

Figure 1:
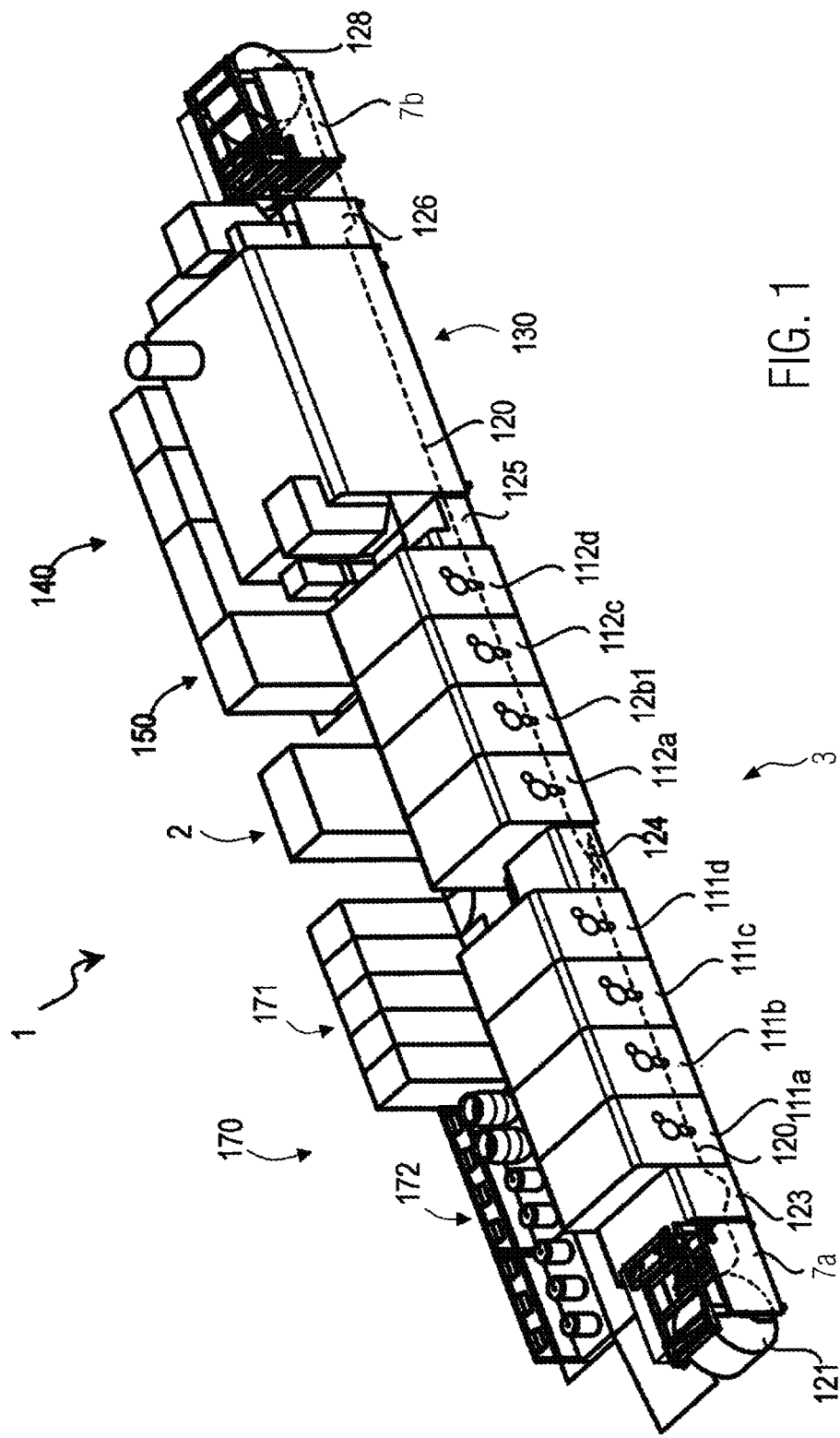

| | | | |
|---|---|---|---|
| 2001/0006375 A1* | 7/2001 | Tomooka | G06F 3/1446 345/4 |
| 2004/0248561 A1* | 12/2004 | Nykanen | H04L 47/10 455/414.2 |
| 2005/0254090 A1* | 11/2005 | Kammerlocher | G03G 15/502 358/1.18 |
| 2011/0046754 A1 | 2/2011 | Bromley et al. | |
| 2014/0281038 A1* | 9/2014 | Hong | H04L 67/1095 709/248 |
| 2014/0281742 A1* | 9/2014 | Probin | G08B 25/004 714/48 |
| 2016/0065435 A1* | 3/2016 | Ito | H04L 43/0864 375/358 |
| 2016/0103566 A1 | 4/2016 | Haas et al. | |
| 2016/0338613 A1* | 11/2016 | Beckers | G01R 33/56308 |

FOREIGN PATENT DOCUMENTS

| | | |
|---|---|---|
| DE | 102008048256 A1 | 4/2010 |
| DE | 102009060334 A1 | 6/2011 |
| DE | 102010015985 A1 | 9/2011 |
| DE | 102012111791 A1 | 6/2014 |
| DE | 102014114584 A1 | 4/2016 |

\* cited by examiner

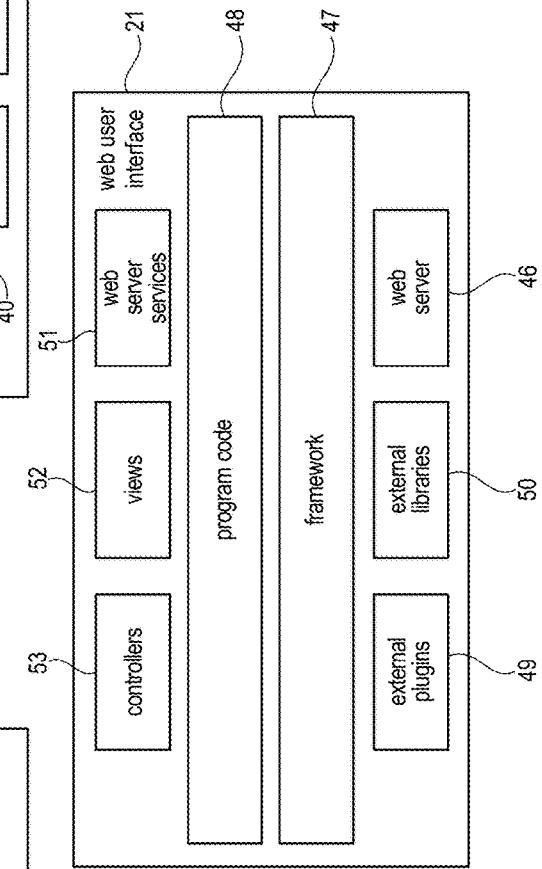
Fig. 5
Fig. 6
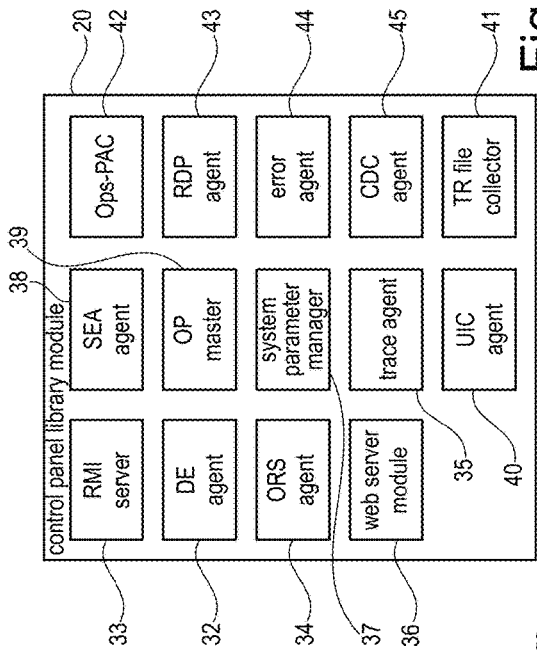
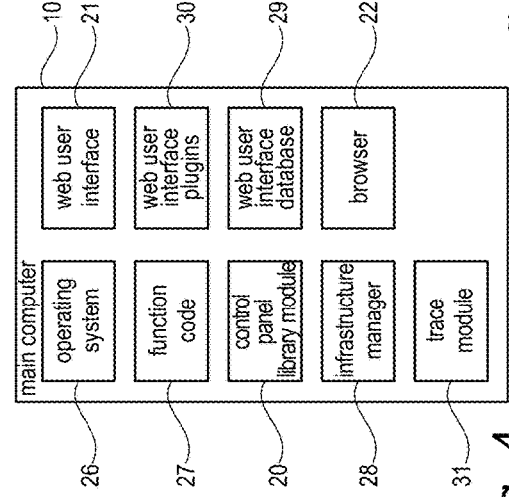
Fig. 4

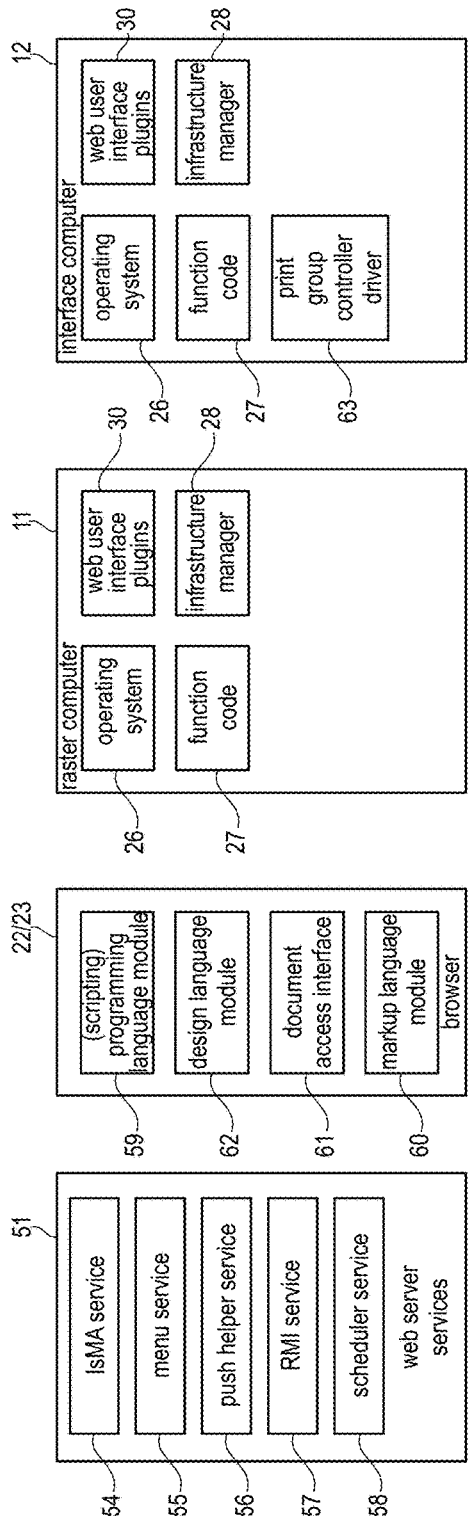
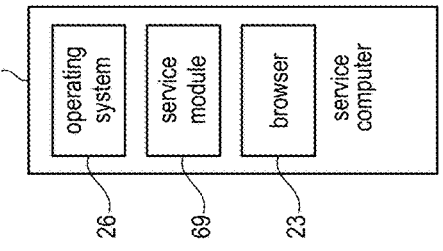
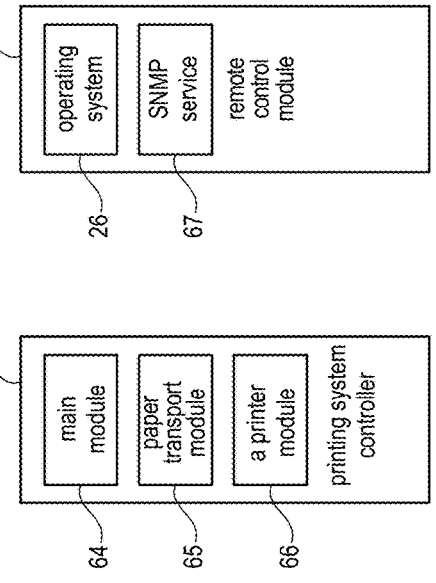

| Control panel ID | Display object ID | Session ID | Web socket ID | Window ID | User ID | Data source ID | Focus (window active) | Synchronization information |
|---|---|---|---|---|---|---|---|---|
| G1 | a | S1 | W1 | F1 | A | 0 | true | X |
| G1 | b | S1 | W1 | F1 | A | 0 | true | X |
| G1 | c | S1 | W1 | F1 | A | D1 | true | X |
| G2 | d | S1 | W1 | F2 | A | D2 | false | |
| G2 | e | S1 | W1 | F2 | A | D3 | false | |
| G2 | f | S1 | W1 | F2 | A | 0 | false | |
| G3 | g | S2 | W2 | F1 | A | 0 | true | |
| G3 | h | S2 | W2 | F1 | A | 0 | true | |
| G3 | i | S2 | W2 | F1 | A | D1 | true | |
| G4 | j | S3 | W3 | F1 | B | 0 | false | G1 |
| G4 | k | S3 | W3 | F1 | B | 0 | false | G1 |
| G4 | l | S3 | W3 | F1 | B | D1 | false | G1 |
| G5 | m | S3 | W3 | F2 | B | 0 | true | G1 |
| G5 | n | S3 | W3 | F2 | B | 0 | true | G1 |
| G5 | o | S3 | W3 | F2 | B | D3 | true | G1 |
| G5 | p | S3 | W3 | F2 | B | D4 | true | G1 |

FIG. 15

METHOD TO SYNCHRONIZE CONTROL PANELS OF A PRODUCTION SYSTEM

CROSS REFERENCE TO RELATED APPLICATIONS

This patent application claims priority to German Patent Application No. 102015117479.0, filed Oct. 14, 2015, which is incorporated herein by reference in its entirety.

BACKGROUND

The disclosure is directed to a method to synchronize control panels of a production system, in particular of a printing system.

A computer for a printing machine—in particular sheet-fed offset printing machine—is described in DE 297 20 991 U1, in which the printing machine has multiple computers which are connected with one another via a bus. At least one of the computers has a display and input device. This one computer is a portable computer that is connected with the printing machine using a radio interface and serves to control the printing machine.

An additional device for controlling a printing machine is described in DE 36 14 744 C2, in which an electronic control unit is designed to be portable. The signals between the portable electronic control unit and a stationary receiver are transmitted in encoded form.

US 2011/0046754 A1 describes a method and a device for generating a human-machine interface and for showing the interface at least at one end device. This may be implemented using web-based platforms, in particular in that web server and web browser may be used, as well as a hypertext transfer protocol. A server that generates the human-machine interface may be connected with multiple end devices, and the generated human-machine interface may be transferred to the multiple end devices that show this. The data transfer thereby occurs as a continuous data stream between the server and the end devices, or as an asynchronous data transfer, that is initiated by the server or one of the end devices.

Available under the trade name TeamViewer is a software with which a screen display of one computer may be transmitted to an additional computer so that all changes at this one computer may be viewed at the additional computer. This type of transmission or mirroring of the screen display is also possible at multiple computers. With this software, inputs may also be transmitted from one computer to the other computers. A corresponding program that controls the connection with the additional computers is to be installed at each computer that participates in such a common session. This software has proven very useful for conducting maintenance tasks and training. However, this is not suitable in order to exchange data with one another in a control system, since the complete control over the control system could hereby be passed to an arbitrary third computer, which is normally not allowed for safety and/or security reasons. In addition to this, specific program sections need to be installed at the respective computers, which is normally not desired in a control system. Such programs are therefore unsuitable for a production system with which individual devices of the production system are controlled.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 illustrates a digital printer with an example configuration of said digital printer.

Figure 2:
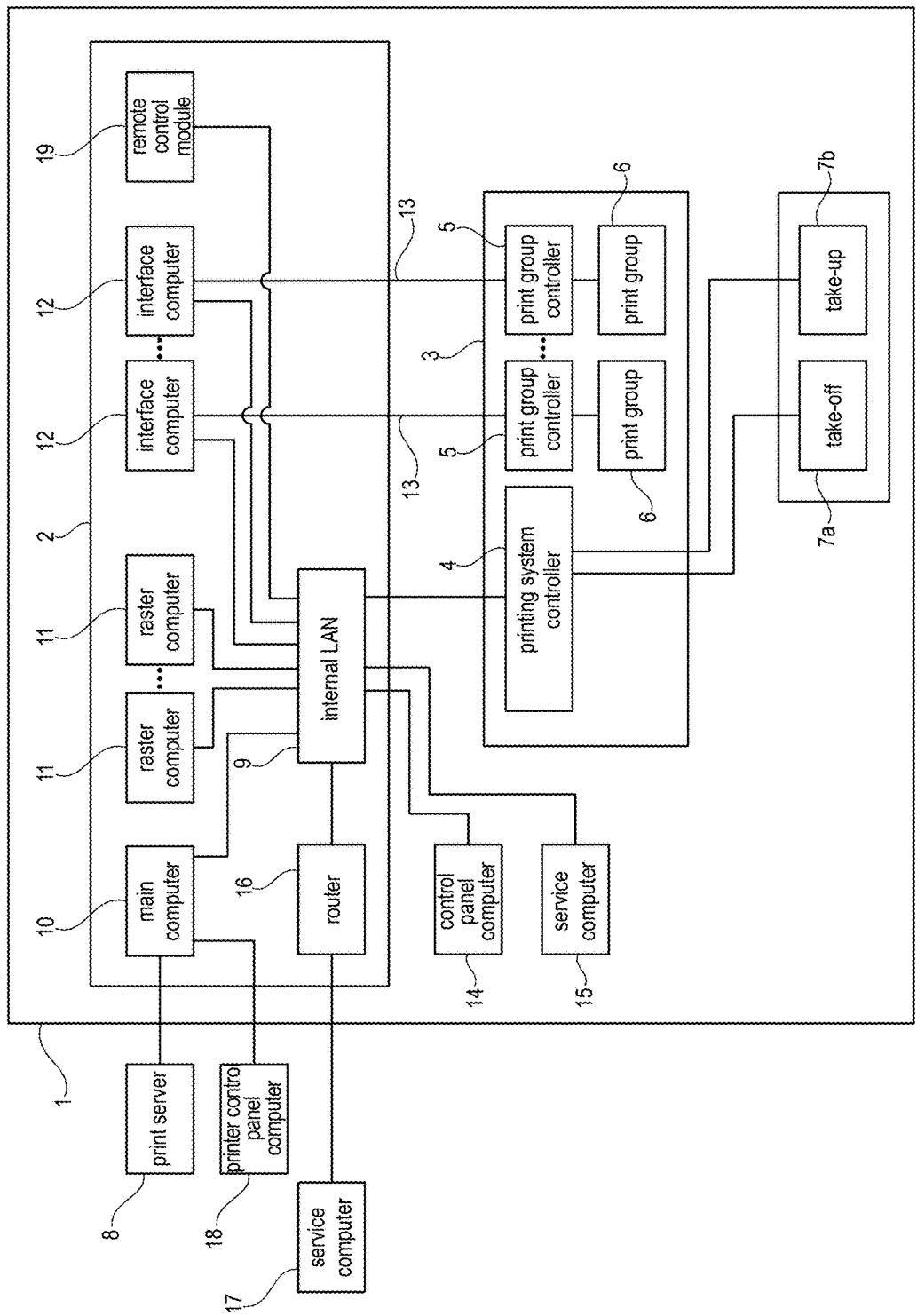
Figure 3:
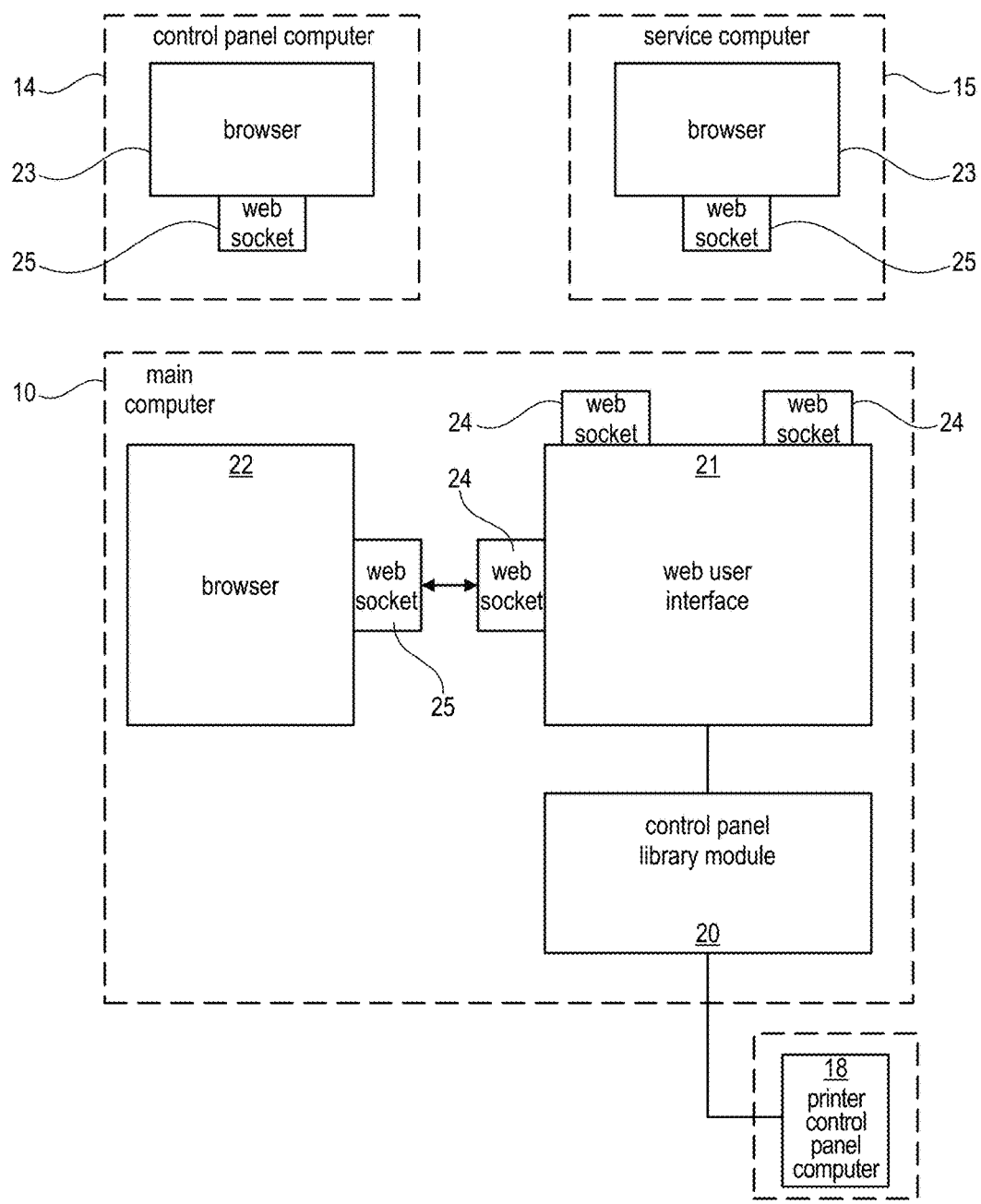
Figure 16:
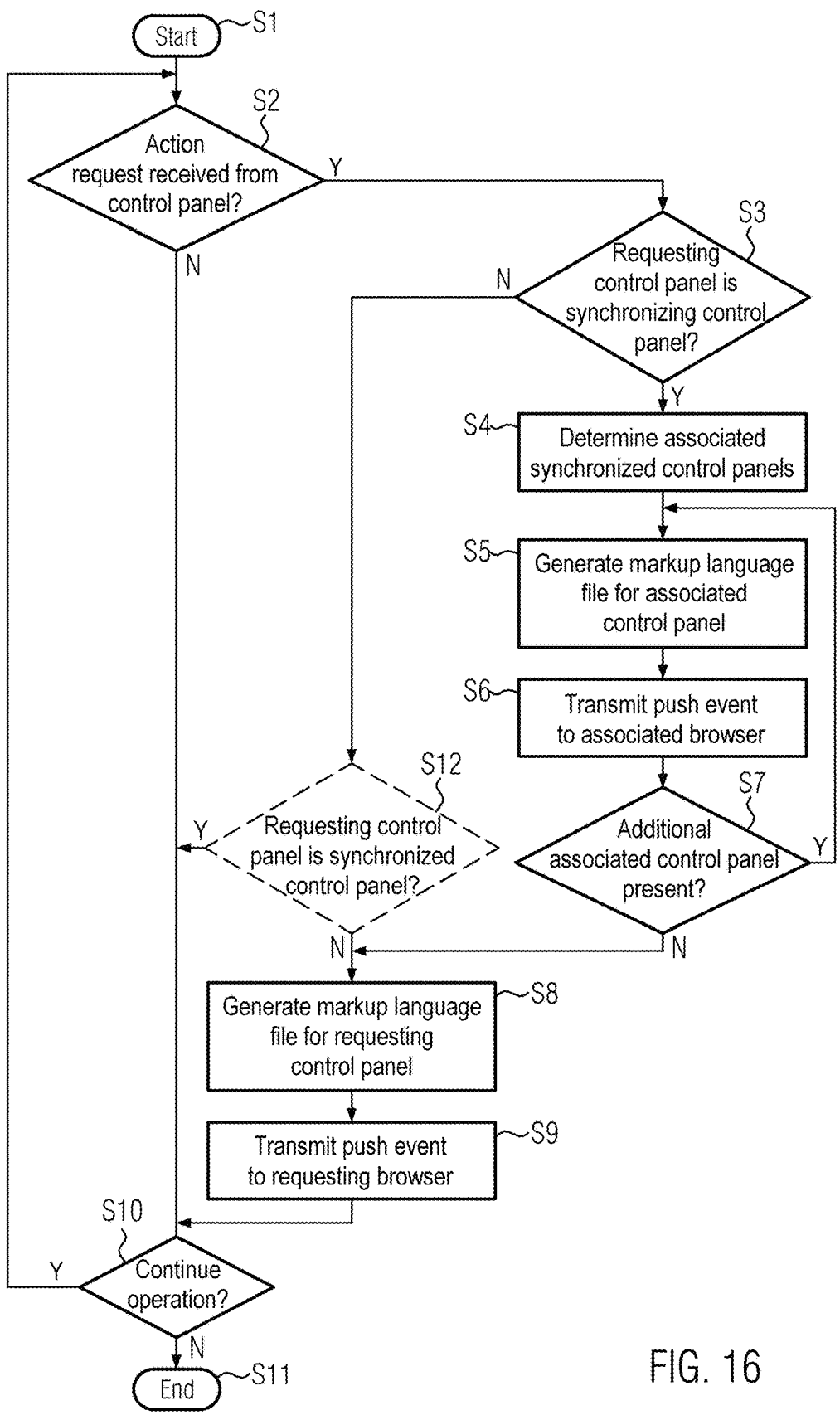
Figure 17:
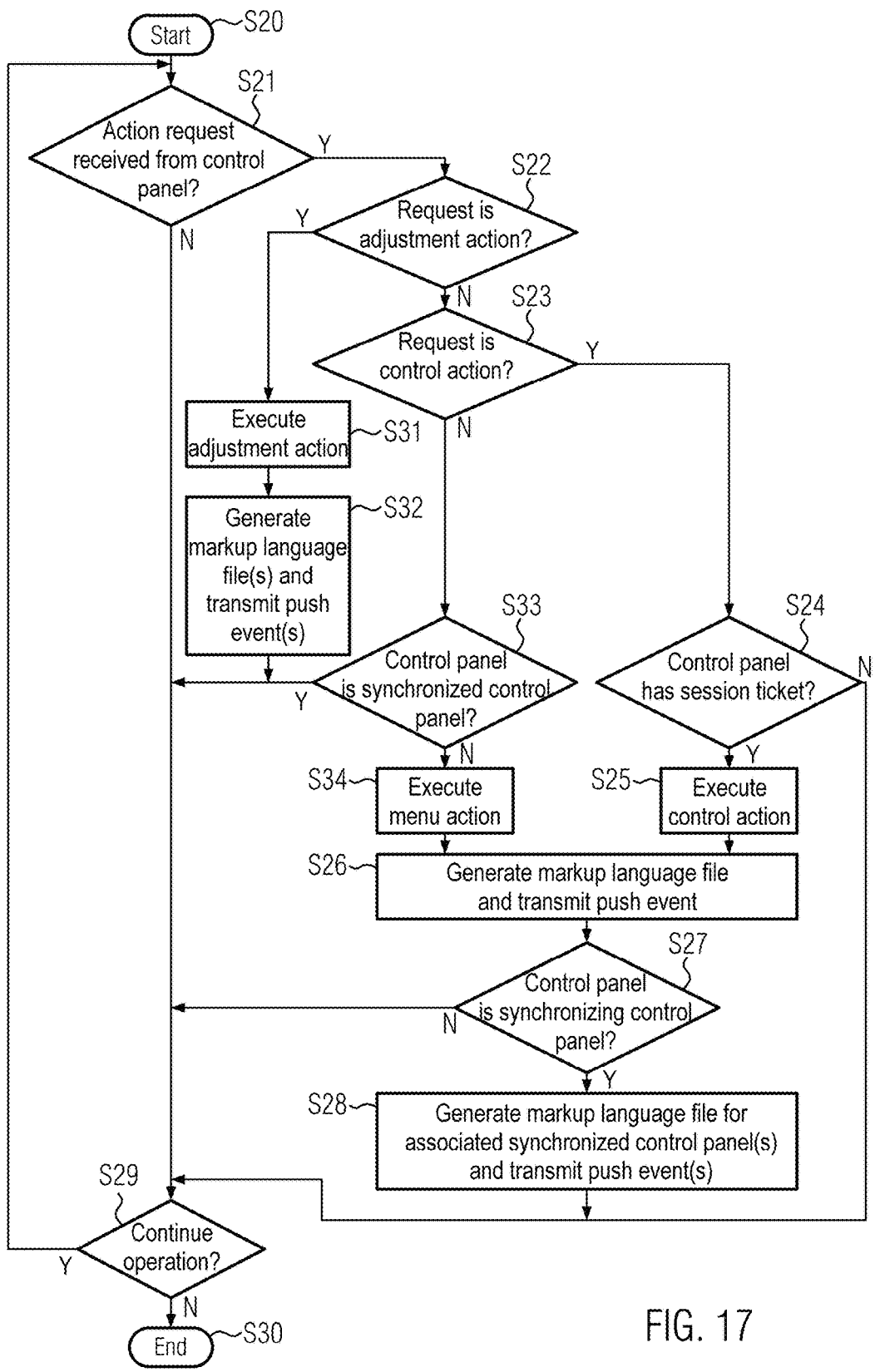

FIG. 2 illustrates a schematic block diagram, a printing system, a control system and systems connected therewith according to exemplary embodiments of the present disclosure, FIG. 3 illustrates a schematic block diagram, a main computer of a control system and client computers connected with said main computer according to exemplary embodiments of the present disclosure, FIG. 4 through FIG. 14 illustrate schematic hardware and software components of a control system or of client computers according to exemplary embodiments of the present disclosure, FIG. 15 illustrates a reference table according to an exemplary embodiment of the present disclosure, FIG. 16 illustrates a method for synchronization of control panels of a production system according to an exemplary embodiment of the present disclosure, and FIG. 17 illustrates an expanded method for synchronization of control panels of a production system according to an exemplary embodiment of the present disclosure.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an object of the present disclosure to achieve a method and a production system with which many control panels may be used, wherein groups of control panels may be synchronized.

In an exemplary embodiment, given a method according to the disclosure for the synchronization of multiple control panels of a production system, in particular of a printing system, the production system has a control system that comprises a main computer. The main computer is connected via a data connection with one or more client computers at which a browser is respectively executed. A control panel module library is installed at the main computer and is executed therein. Generated and provided with the control panel module library is a control panel for the production system that is transmitted from the main computer to the respective browser as a markup language file and is executed in the browser to show the control panel. The markup language file is transmitted from the main computer to one of the client computers using a web user interface installed and executed at the main computer. Should one of the control panels change, the web user interface transmits change information to this control panel that describes the changes to said control panel. At the main computer, a reference table is provided with which a reference is established between the respective control panels to be synchronized. Upon transmitting the change information, the web user interface checks—using the reference table—whether an additional control panel is to be synchronized with this control panel. If so, the web user interface also transmits the respective change information to the additional control panel.

In one or more exemplary embodiments, multiple control panels of a production system that are shown in browsers can be synchronized with one another using this method.

In an exemplary embodiment, a control panel is a user interface displayed at a display device of a computer for operation of a production system. Each control panel has one or more display objects that are respectively a self-contained element of the control panel and serve to show the control panel.

Synchronization refers to the condition where changes made at one control panel are also displayed at other control panels that are synchronized. Display objects of different control panels that are synchronized with one another will display the same information using the synchronization.

The web user interface may, for example, establish whether the control panels should change in that it detects a request for an action via the corresponding control panel, as is explained further below.

Change information represents a request to the receiving control panel to change the depiction of the control panel. Change information may include additional parameters to implement changes to a control panel.

Production systems may have large dimensions, in particular, across multiple levels of a building. The control and adjustment or the parameterization of a production system is often a complex process that is implemented multiple times, simultaneously, by multiple different operators. Moreover, inspections of the production system are often necessary to check the set parameters, since specific intermediate steps in the production may be detected and assessed only at established locations. With multiple users making adjustments, different points in the production system for checking intermediate products, and long distances that often thereby need to be covered, the system can include a plurality of control panels at the different check sites and for the different operators so as to conduct the adjustment and checking of processes efficiently and quickly. The operation and adjustment of the production system is therefore more efficient and significantly simplified via the use of multiple control panels according to exemplary embodiments described herein.

In an exemplary embodiment, an automatic synchronization of multiple control panels of a user at different check sites additionally increases the efficiency, since the information content of each control panel corresponds to the last displayed state and the work process may be continued immediately in the event of a location change.

Moreover, the operation and adjustment of the production system may be more efficiently designed given the automatic synchronization of multiple control panels of different users, since the user is comprehensively informed of adjustment processes of other users and may implement his own operating processes to match these or may make adjustments to parameters of the production system.

Since the administration or generation of the control panels takes place centrally at a main computer, an efficient user security, production security and system security may be provided.

Using browsers or a browser technology, such control panels may be realized that are independent of the hardware and/or software platform that is used.

An additional advantage of the use of browser technology is a more efficient programming or creation of the control panels since display objects, software interfaces, program functions etc. are already predefined for use or may be easily integrated. Various control panels may additionally be generated at run time depending on the status of the production system, of production parameters, the respective user rights, the synchronization relationships etc., such that the provision of the control panels may take place more efficiently and their information content can be of more flexible design.

An additional advantage of the use of browsers for the control panel presentation is that predefined program interfaces are available that enable a browser to implement a bidirectional data exchange in real time.

The advantages explained above can be combined with one another via the use of the browser technology for presentation of multiple control panels at different points in the production system.

The browser that shows the control panel is can be executed at a corresponding client computer in a session that is an existing connection of the corresponding client computer with the main computer. The web user interface uses a session ID to identify the respective control panel, which session ID is a unique identification designation for the respective session and is stored in the reference table.

Given browsers that show only one control panel, a unique relationship is hereby established between the displayed control panel and the displaying browser via the use of the respective session ID.

In an exemplary embodiment, a browser may be used in which multiple windows may be opened in which control panels may be shown. A window ID is thereby provided that is an identification designator for the respective browser window. The web user interface uses the window ID to identify the respective control panel shown in a browser window.

A unique association of a displayed control panel with one of various windows (tabs) of a browser is hereby achieved. A use of a combination of session ID and window ID then enables the unique referencing, at the production system, of a control panel shown in a window of a browser. The various windows or tabs of a browser may be addressed via flags in the manner of a register navigation. Adjustments to the production system may be made more efficiently via the depiction of multiple control panels in a browser, since a quicker change is possible between various windows that display control panels with different content and setting parameters.

In an exemplary embodiment, the reference that is established in the reference table between the respective control panels to be synchronized may be designed as a hierarchical relationship. A specific one of the control panels is thereby established as a synchronizing control panel, and one or more other control panels are established as control panels synchronized with this. The web user interface exclusively changes the one or more synchronized control panels given changes to the synchronizing control panel.

By establishing control panels to be synchronized with one another as synchronizing control panels and synchronized control panels, a direction in which control panels to be synchronized with one another should be synchronized is unambiguously determined. At the production system, one or more synchronizing control panels may thereby be provided that respectively synchronize one or more synchronized control panels. Via the provision of such a hierarchical relationship between control panels to be synchronized, various use cases of a synchronization of control panels may be covered that are explained further below.

In an exemplary embodiment, the change information may include a reference to a markup language file. Such a reference to a markup language file enables the control panel to request or read the corresponding markup language file. In an exemplary embodiment, the reference may be designed as, for example (and not limited to) a network address, an identification or browser link, a memory address, a device address, a file identification, an identification of a physical or logical link, or a combination thereof.

In an exemplary embodiment, the main computer may execute predetermined actions which may be requested by one of the control panels using an action request. Upon transmission of predetermined action requests, the web user interface transmits a change information according to the requirements of the respective action request to the control panel requesting the action.

Using an action request, a control panel may request one of multiple different actions at the main computer. The requested actions thereby include control actions with which control parameters at the production system may be changed; menu actions with which the display objects shown in the control panel should be changed; and synchronization adjustment actions with which the synchronization behavior between the control panels should be changed.

The web user interface may allocate one or more session tickets to a control panel according to predetermined rules. The respective session ticket thereby authorizes the control panel to change control parameters using a request for a control action for a portion of or the entire production system. Upon receiving a request for a control action, the web user interface checks whether the requesting control panel possesses the session ticket authorized to execute the control action. The web user interface only executes the control action if the session ticket is present.

A part of the production system thereby comprises one or more apparatuses, mechanisms, devices, components and/or parameters.

Via the use of a session ticket that authorizes a control panel to change control parameters of a part of or of the entire production system, it is ensured that individual control parameters may only be respectively changed at a uniquely associated control panel. An adjustment of a control parameter from different control panels is hereby blocked. This serves for the security or a secure adjustment of the production system. In that different session tickets may be allocated for different regions or parts of the production system, these different regions or different parts of the production system may be adjusted independently of one another at different control panels. In particular, authorizations that are delimited from one another for the adjustment of different production parameters may thereby be made possible for different users.

The web user interface may make adjustments to the synchronization of the control panels which may be requested by the control panels using a request for a synchronization adjustment action. The web user interface executes only the requested synchronization adjustment actions from each of the synchronized control panels.

It is hereby ensured that, at a synchronized control panel, exclusively adjustment actions that pertain to the synchronization of this control panel may be implemented, whereas all other requested actions are blocked at a synchronized control panel. Via the possibility to request a synchronization adjustment action, a synchronized control panel can be brought into an unsynchronized state so that the synchronization relationship of this control panel is canceled.

Given a change to a control panel, the web user interface can extract an identification of control panels to be synchronized with one another, their users, their session and/or their window. Using this identification, the web user interface identifies the users of the control panels and determines the rights associated with the respective user. Using these user rights, the web user interface checks whether the control panels may be synchronized. Only if this is the case does the web user interface (21) transmit a change information to the synchronized control panel.

The user rights predetermined at the production system are hereby taken into account as well in the synchronization of control panels. At the production system, control panels may be provided that can be displayed only with elevated user rights or are displayed only to users who have elevated user rights. Given display of such a control panel with which a different control panel of another user who has lower user rights is synchronized, the synchronization of the control panel of the user with the lower user rights is thus blocked. Often, control panels whose display requires elevated user rights include wide-ranging adjustment possibilities for parameters of the production system. Via the blockade of the display of such a control panel for a user with lower user rights, it is thus prevented that such a user may see or make adjustments to parameters of the production system for which he has no authorization.

A blockade of the synchronization means that the segment of the control panel for which the user has no rights is not displayed, or that the corresponding data—meaning the data linked with the respective display object—are not shown. The remaining segment of the control panel for which suitable rights are present is displayed.

During a synchronization blockade, a message may be shown to the user with the lower user rights. The message can inform the user about the blockade or the absence of the synchronization. For example, this message may be a character string "No Synchronization."

If, during a synchronization blockade, the synchronizing control panel is changed such that the user rights of the user of the synchronized control panel are now sufficient for the display of the control panel, the synchronization blockade is lifted and the control panels are re-synchronized.

Instead of the entire control panel, the synchronization blockade may also pertain only to individual display objects or a portion of the display objects of the control panel—and/or only to the data linked with the corresponding display objects—for a user with insufficient user rights.

In an exemplary embodiment, given a change to a control panel or its display objects, the web user interface can extract an identification of the control panels to be synchronized with one another, their users, their session and/or their windows. Using this identification, the web user interface identifies the user of the control panels and determines the rights associated with the respective user. Using these user rights, the web user interface checks for each display object of the control panels whether the respective display object may be synchronized between the control panels. Only in the event that this is the case does the web user interface transmit a change information with regard to the respective display object to the synchronized control panel.

The synchronization of display objects that require elevated user rights to display may hereby be blocked at a control panel of a user with lower user rights, whereas display objects of the same control panel that require only the user rights that the user of the synchronized control panel has are synchronized. In an event of insufficient user rights, the synchronization of the entire control panel is consequently not blocked as was already explained above; rather, the blockade occurs at the level of the display objects. This means that, given insufficient user rights of a user of a synchronized control panel, at least the display objects for whose display the user rights are sufficient are synchronized and shown.

In an exemplary embodiment, the web user interface transmits change information to synchronized control panels given a change to a display object. The change information describes the change of this display object.

In an exemplary embodiment, change information that describes only the changes that have occurred to display objects of a synchronizing control panel may hereby be transmitted to a synchronized control panel. Transmitted data are thereby reduced.

In an exemplary embodiment, given a change to a display object, the changed display object can be updated independently of other display objects.

Individual display objects may hereby be updated given a change. This reduces the required computation time for the execution or for the interpretation of the markup language file to show a control panel.

Given a change to a display object, this is synchronized only after the expiration of a predetermined wait time since the last synchronization of the control panel or of one of the display objects of the control panel.

By observing a predetermined wait time between the synchronization processes, less data are transferred to the respective control panel. This reduces the transferred amount of data. In an exemplary embodiment, the wait time may be, for example (but not limited to) 0.1 seconds to 10 seconds.

In an exemplary embodiment, a browser buffer is provided at the main computer for each active browser, and markup language files that are already stored in the browser buffer are overwritten with modified markup language files.

It is thereby ensured that only current markup language files for transmission to the associated active browsers are stored in the respective browser buffer. This is reasonable in particular if the predetermined wait time since the last synchronization of the control panel or of one of the display objects of the control panel is provided as explained above.

An active browser is a browser which shows a control panel, is functional or reactive, and is executed. That is, an active browser is a browser that has not crashed.

In an exemplary embodiment, markup language files stored in the browser buffer are transmitted in segments to the respective browser associated with the browser buffer. Pauses may thereby be inserted between the transmission of successive file segments to one of the browsers, and in these pauses file segments of markup language files may be transmitted as needed to one or more other browsers.

Via a per-segment transmission with intervening pauses, the control panels may be updated in real time, or nearly in real time, even given production systems that have a plurality of control panels.

With regard to each control panel, whether the browser showing the control panel (or the window of the browser that shows the control panel) shows the control panel in the foreground, or whether the focus (which marks a browser or a window of a browser as active) is on the browser or the window of the browser, can be stored in a reference table according to an exemplary embodiment. Given a change to control panels, the web user interface transmits the change information only to control panels that are shown in the foreground and/or have focus and/or receive focus.

Via a transmission of the change information only to control panels that are shown in the foreground and/or have focus and/or receive focus, only such control panels are also synchronized. The data to be transferred are thereby reduced.

In an exemplary embodiment, the web user interface and the respective browser that shows the control panel can communicate using web sockets. An additional web socket is thereby coupled with the web user interface of one of the web sockets and with the browser so that a permanent data connection is formed between the web user interface and the respective browser.

Web sockets provide an efficient data transmission since a logical data connection between these is permanently maintained, and thus the establishment of a logical data connection is not necessary for a data transfer.

In an exemplary embodiment, the transmission of the change information is formed by the web user interface as a transmission of a push event to the corresponding browser. The receipt of the push event induces the corresponding browser to request a prepared markup language file from the main computer, to receive this and to execute this in order to show the control panel.

In one or more exemplary embodiments of the present disclosure, a control system for a production system, such as a printing system, can include a main computer that is connected via a data connection with one or more client computers at which a browser is installed and can be executed. In an exemplary embodiment, a control panel module library is installed and executable at the main computer, with which control panel module library a control panel for the production system is generated and provided that is transmitted as a markup language file from the main computer to the respective browser and is executed in the browser to show the control panel. The control system is thereby designed to implement a method as it is explained above.

According to a further aspect of the present disclosure, a production system with the control system explained above and a production apparatus (in particular a printing system) that is connected with the control system are provided.

In an exemplary embodiment, the production system is a liquid toner printing system.

Liquid toner printing systems are printing systems in which toner particles are applied onto a recording medium to be printed to with the aid of a liquid developer. For this, a latent charge image of a charge image carrier is inked using electrophoresis, with the aid of a liquid developer. The toner image that is created in such a manner is transferred onto the recording medium indirectly (via a transfer element) or directly. The liquid developer has toner particles and carrier fluid in a desired ratio. Mineral oil is can be used as a carrier fluid. In order to provide the toner particles with an electrostatic charge, charge control substances are added to the liquid developer. Further additives are additionally added, for example in order to achieve the desired viscosity or a desired drying behavior of the liquid developer.

Non-limiting examples of digital printers are described in DE 10 2010 015 985 A1, DE 10 2008 048 256 A1, DE 10 2009 060 334 A1 and/or DE 10 2012 111 791 A1.

An exemplary embodiment of a digital printer comprises a printing system 1 and a control system 2 (FIGS. 1 and 2).

As shown in FIG. 1, a printing system 1 that is a digital printer for printing to a recording medium 120 has one or more print groups 111*a*-111*d* and 112*a*-112*d* that print a toner image (print image) onto the recording medium 120. As shown, a web-shaped recording medium 120 (as a recording medium 120) is unrolled from a roller 121 with the aid of a take-off 7a and is supplied to the first print group 111a. The print image is fixed on the recording medium 120 in a fixer 130. The recording medium 120 may subsequently be taken up on a roller 128 with the aid of a take-up 7b. Such a configuration is also designated as a roll-to-roll printer.

In an exemplary embodiment shown in FIG. 1, the web-shaped recording medium 120 is printed in full color on the front side with four print groups 111a through 111d and on the back side with four print groups 112a through 112d (what is known as a 4/4 configuration). For this, the recording medium 120 is unwound from the roller 121 by the take-off 7a and is supplied via an optional conditioning group 123 to the first print group 111a. The recording medium 120 may be pretreated or coated with a suitable substance in the conditioning group 123. Wax or chemically equivalent substances can be used as a coating substance (also designated as a primer).

This substance may be applied over the entire area or only to the locations of the recording medium 120 that are to be printed to later, in order to prepare the recording medium 120 for printing and/or to affect the absorption property of the recording medium 120 upon application of the print image. It is therefore prevented that the toner particles or carrier fluid that are applied later do not penetrate too significantly into the recording medium 120, but rather remain essentially on the surface (color quality and image quality is thereby improved).

The recording medium 120 is subsequently initially supplied to the first print groups 111a through 111d in order, in which print groups only the front side is printed to. Each print group 111a-111d typically prints to the recording medium 120 in a different color or even with different toner material, for example MICR toner which can be read electromagnetically.

After printing to the front side, the recording medium 120 is turned in a turner 124 and supplied to the remaining print groups 112a-112d for printing to the back side. Optionally, an additional conditioning group (not shown) may be arranged in the region of the turner 124, via which conditioning group the recording medium 120 is prepared for printing to the back side, for example a quick fixing (partial fixing) or other conditioning of the previous printed front side print image (or of the entire front side or also of the entire back side). It is thus prevented that the front side print image is mechanically damaged by the subsequent print groups upon further transport.

In order to achieve a full color printing, at least four colors (and therefore at least four print groups 111, 112) are required, and in fact the primary colors YMCK (yellow, magenta, cyan and black), for example. Additional print groups 111, 112 with special colors (for example customer-specific colors or additional primary colors in order to expand the printable color space) may also be used.

Arranged after the print group 112d is a registration unit 125 via which the register marks (which are printed on the recording medium 120 independently of the print image, in particular outside of the print image) are evaluated. The transversal and longitudinal registration (the primary color dots that form a color dot should be arranged atop one another or spatially very close to one another; this is also designated as color registration or full-color registration) and the register (front side and back side must precisely spatially coincide) can therefore be adjusted so that a qualitatively good print image is achieved.

Arranged after the registration unit 125 is the fixer 130 via which the print image on the recording medium 120 is fixed. Given electrophoretic digital printing, a thermal dryer can be used as a fixer 130, which thermal dryer largely evaporates the carrier fluid so that only the toner particles still remain on the recording medium 120. This occurs under the effect of heat. The toner particles may thereby also be fused onto the recording medium 120, insofar as they have a material (resin, for example) that may be fused as the result of a fixer heat effect.

Arranged after the fixer 130 is a drawing plant 126 that draws the recording medium 120 through all print groups 111a-112d and the fixer 130 without an additional drive being arranged in this region. A friction drive for the recording medium 120 would create the risk that the as of yet unfixed print image could be smeared.

The drawing plant 126 supplies the recording medium 120 to the take-up 7b that rolls up the printed recording medium 120.

Centrally arranged in the print groups 111, 112 and the fixer 130 are all supply devices for the digital printing 1, such as climate control fixer modules 140, power supply 150, control system 2 (controller), fluid management modules 170 (such as fluid control unit 171 and reservoirs 172 of the different fluids). In particular, pure carrier fluid, highly concentrated liquid developer (higher proportion of toner particles in relation to the carrier fluid) and serum (liquid developer plus charge control substances) are required as fluids in order to supply the digital printer 1, as well as waste containers for the fluids to be disposed of or containers for cleaning fluid.

The digital printer 1, with its structurally identical print groups 111, 112, is of modular design. The print groups 111, 112 do not differ mechanically, but rather only due to the liquid developer (toner color or toner type) that is used therein.

Such a print group 111, 112 is based on the electrophotographic principle, in which a photoelectric image carrier is inked with charged toner particles with the aid of a liquid developer, and the image that is created in such a manner is transferred to the recording medium 120.

The print group 111, 112 can include an electrophotography station, a developer station and a transfer station.

Depending on the model and configuration, such high-capacity digital printers extend over a length of 10 meters to 30 meters. Therefore, multiple control panels are to be appropriately provided that simultaneously allow multiple people to read data of the digital printer and look at control panels at multiple locations.

In an exemplary embodiment, the printing system 1 comprises the control system 2 and the print group unit 3. The control system 2 is designed to prepare print jobs such that they may be printed by the print group unit 3. In an exemplary embodiment, the control system 2 includes processor circuitry configured to perform one or more functions of the control system 2. The print jobs (which are present in a print data language) hereby need to be converted into rastered data. This is normally executed in multiple intermediate steps that, among other things, include the rastering of the print data.

The print group unit 3 has internal control systems that comprise a printing system controller 4 and multiple print group controllers 5 (BDB: bar driving board) (FIG. 2). The print group controllers 5 transmit the rastered print data to the corresponding print groups 6. These rastered print data are either binary or multilevel print data. Given binary print data, each bit represents a print point. If the bit is set, the corresponding print point is printed. If the bit is not set, the corresponding print point is not printed. Given multilevel print data, a data word comprised of multiple bits is associated with each print dot; how large the respective print dot is to be printed is defined with said data word. In an exemplary embodiment, the printing system controller 4 includes processor circuitry configured to perform one or more functions of the printing system controller 4. In an exemplary embodiment, the print group controllers 5 include processor circuitry configured to perform one or more functions of the print group controllers 5.

The printing system controller 4 controls the main module of the print group unit 3, the paper transport, and executes general control tasks with regard to the print groups 6. The printing system controller 4 has interfaces with pre- and post-processing systems, which in particular comprise the take-off 7*a* and the take-up driver 7*b*. Additional pre- and post-processing systems may be connected, for example a cutting system, enveloping system or the like.

The control system 2 serves to process print jobs which are transmitted to said control system 2 from a print server 8. Such a print job normally comprises print data and a job ticket. The print data are present in a print data language (for example IPDS, AFP, PCL, PS) and are transmitted as a print data stream to the control system 2 of the printing system 1. The job ticket includes instructions as to how the print data are to be processed. The control system 2 has multiple computer units that are connected with one another via an internal LAN 9. For example, the LAN may be designed as an Ethernet or Infiniband. The computer units comprise a main computer 10, multiple raster computers 11 and multiple interface computers 12.

In an exemplary embodiment, the main computer 10 receives the print jobs and distributes portions of the print jobs to the raster computers 11 for rastering of the print data. The main computer 10 hereby attempts to utilize the raster computers 11 as uniformly as possible.

The raster computers 11 convert the print data into the rastered print data suitable for controlling the print groups 6. The rastered print data are forwarded from the raster computers 11 to the interface computer 12 via the internal LAN 9.

The rastered print data are cached at the interface computers 12. Each interface computer 12 is respectively connected with one of the print group controllers 5 and transfers the rastered print data to the corresponding print group controller 5 via the optical waveguide 13 for printout of a specific color. The print data are thus present at the interface computers 12 in the form of color separations of the respective print group 6.

The printing system controller 4 is connected to an external interface of the internal LAN 9 of the control system 2 and receives from control commands from the main computer 10 of the control system 2 for controlling the printing system and the pre- and post-processing systems.

The internal LAN 9 of the control system 2 may have additional external interfaces for the connection of one or more control panel computers 14 and/or one or more service computers 15.

Furthermore, the control system 2 has a router 16 to which a service computer 17 may be connected via a WAN.

A printer control panel computer 18 is directly connected with the main computer 10 of the control system 2 via an SPO-LAN (Service Panel Operator-LAN). The printer control panel computer 18 serves to monitor and control the print data. This printer control panel computer 18 is typically used by an operator who controls the workflow of the different printing processes at the printing system. Conversely, the control panel computer 14 or service computer 15 are used by operators or service technicians who are responsible for the continuous operation of the printing system.

The printing system may have multiple control panel computers 14 and/or multiple service computers 15, and also may be connected with multiple printer control panel computers 18.

The service computers 15, 17 differ from the control panel computers 14 in their access rights, wherein the service computers 15, 17 may make more adjustments to printing systems than the control panel computer 14, as is explained further below. For example, an installation of software components may also be performed at service computers or at a printing system, which is not possible at control panel computers 14.

The control system 2 has a remote control module (PCI: Power Control Interface) 19. With this remote control module 19, the control system 2 may be started up or shut down via remote control. Moreover, this remote control module 19 supplies additional functions for remote control of the control system 2.

In an exemplary embodiment, given this printing system, multiple control panels are provided at the computers 14, 15, 17, 18.

At the main computer 10 of the control system 2, a control panel library module 20 is provided which comprises multiple control panel modules with which a control panel for the printing system may be presented on the computer display (FIG. 3). The control panel modules also allow a control of the printing system 1 via the control panel presented on the computer display.

The printer control panel computer 18 is connected with the control panel library module 20 via the SPO-LAN or another communication network configuration. Provided at the printer control panel computer 18 is a client program with which the control panel is presented and the corresponding control functions are executed.

The control panel library module 20 is connected with a web user interface 21 that is a web server with which the control panel modules of the control panel library module 20 are made available in a browser. In the present exemplary embodiment, the web user interface 21 has been realized via an Apache Tomcat server. In principle, other web servers are also suitable here.

This web user interface 21 may communicate directly with a browser 22 provided on the same computer, wherein the communication is implemented via web sockets 24, 25. For communication with "external" browsers 23 which are provided on additional computers 14, 15, the web user interface 21 is coupled with an additional respective web socket 24. The web socket 24, 25 is a software module that forms an interface which may establish a continuous logical Internet connection with a browser that is connected via a data connection with the computer at which the web socket 24, 25 is arranged. The data connection is hereby a data network, for example.

The browser 22 on the main computer 10 and the browsers 23 on the computers 14, 15 may thus be continuously supplied with information from the web user interface 21 or may transmit information and in particular messages to the web user interface 21. For this, the browsers 22, 23 respectively have a corresponding web socket 25.

The individual software modules that are provided on the different computers are explained in detail in the following.

In an exemplary embodiment, in addition to the already explained control panel library module 20, the web user interface 21 and the browser 22, an operating system 26, a function code 27, an infrastructure manager 28 for interfaces to the hardware, a web user interface database 29, web user interface plugins 30, and a trace module 31 are provided at the main computer 10 (FIG. 4).

The trace module 31 serves to record error protocols of all software components executed in the control system 2 and/or in the print group unit 3, and/or of "external" software components that are executed on other computers 8, 14, 15, 16, 17, 18.

The function code 27 is designed for the execution primarily of printing-relevant software routines, for example a load distribution of the print data from the main computer 10 to the raster computers 11, raster calculations at the raster computers 11 for a rastering of the print data, controlling a caching of the rastered print data at the interface computers 12, and controlling a display of the rastered print data at a control panel. With the function code 27, the arriving print jobs are processed so that they may be printed out at the print group unit 3.

Upon receipt of a print job, the function code 27 caches the job ticket at the main computer 10, and upon distribution of the print job to the raster computers 11 the function code 27 caches at the main computer 10 association information about the association of the raster computers 11 with the sections of the respective print job that are to be rastered.

Upon distribution of the rastered print data for printing to the interface computers 12, the function code 27 also stores distribution information about the rastered print data cached at the respective interface computer 12.

In an exemplary embodiment, the web user interface database 29 includes all (or in some embodiments, a portion of) persistent data for the operation of the web user interface 21, for example long-term data, data for user configuration, settings, initialization data (for sensors, for example), data for monitoring structures (which are explained further below), as well as additional data that are necessary for the operation of the web user interface 21.

The web user interface plugins 30 serve for communication with the local computer or additional external computers at which corresponding web user interface plugs are provided. Predefined tasks or applications are stored in a web user interface plugin 30.

In an exemplary embodiment, the control panel library module 20 includes a plurality of control panel modules that are explained in detail in the following (FIG. 5):

A DE agent (device agent) 32 creates a data connection for the communication between the control panel and the printing system, and represents the link between the control panel and the printing system. Furthermore, the DE agent 32 provides a standardized interface in order to make the printer status available.

An RMI server (Remote Method Invocation server) 33 has functions that may be called by an external computer and that are executed on the computer at which the RMI server is executed, for example for the further processing of events. Furthermore, it provides functions that facilitate or enable such a remote access.

An ORS agent (OCÉRemote Service agent) 34 collects hardware data and data of software events and transfers these data from the main computer 10 to a computer (not shown) of a service center via a WAN (Wide Area Network).

A trace agent 35 enables the recording or logging of trace data of other modules and the preparation of these data.

A web server 36 enables the downloading of program libraries (for example of Java program libraries) from the main computer 10 to the computer 14 in order to be able to present and control the control panel at this computer 14. Furthermore, the web server 36 provides a web start function (for example a Java web start function) in order to initialize the control panel at the computer 14. In the present exemplary embodiment, the web server 36 is realized by an Apache Tomcat server. In principle, any other web server, any other program library and/or any other web start function is suitable for this.

A system parameter manager 37 (SPManager) serves for data distribution between the modules.

An SEA agent (service event log agent) 38 creates a protocol or a log file of the events that have occurred.

An OP master 39 provides a network interface, for example an SNMP gateway for the transfer of parameters to and from the printing system 1.

A UIC agent (User Interface Controller agent) 40 enables the control of predetermined workflows or the adjustment of defined states of printing systems connected with the main computer 10. For example, the startup of the printing system 1 may be executed automatically with this.

A TR file collector 41 is an agent that—as a supplement to the trace agent 35—collects and prepares trace data from programs executed on the main computer, which programs have been provided by third-party vendors.

An Ops-PAC (Ops Privileged Access Service) 42 serves to assign privileged rights (administrator rights) to other agents or applications for the implementation of specific functions. These privileged rights are predominantly necessary in order to execute the agents or applications with the desired effect.

An RDP agent (Remote Diagnosis Process agent) 43 provides an internal service interface.

An error agent 44 serves to remedy, collect, distribute, present and reset errors.

A CDC agent 45 serves for the normalized relaying of printing parameters to other agents or modules to other control systems 2 of other printing systems 1. These printing parameters are, for example, paper width, color etc.

The web user interface 21 comprises a plurality of web user interface modules that are explained in detail in the following (FIG. 5):

A web server module 46 (for example an Apache Tomcat) provides the web server functions (already explained above) of the web user interface 21. The web server module 46 and the web server 36 explained above may also be combined into one web server that is executable or executed on the main computer 10.

In the web server 46 is a framework 47 that provides rules, methods, functions, classes and/or structures for the control of the web server module 46, in particular with regard to data objects with which a control panel is described. In the present exemplary embodiment, the framework 47 is a Grails framework. In principle, other frameworks are also suitable here.

The programming of the control of the web server module 46 or of the web user interface 21 takes place with the aid of a program code 48. Program routines that are part of the program code 48 are further transmitted as needed to the browsers 22, 23 for execution, wherein the browsers 22, 23 are controlled via these transmitted program routines. In an exemplary embodiment, the browsers 22, 23 are controlled in a control panel file, as is explained further below. The program code 48 is created in one or more (scripting) programming languages. In the present exemplary embodiment, the (scripting) programming languages that are used are Java and Groovy. In principle, other programming languages or scripting programming languages are suitable here. The program code 48 includes printer-specific programs, program routines, methods, functions, classes, structures and/or extensions.

External plugins 49 and external libraries 50 are used in order to provide additional functions for the programming and/or control of the web user interface 21.

Web server services 51 are made available by the web user interface 21 to external communication partners, wherein external communication partners are systems, installations, devices or software modules that are located outside of the web user interface and communicate with said web user interface 21. The web server services 51 are initiated by the external communication partners and execute functions within the web user interface 21.

Data are processed with the aid of views 52 for presentation at the user interface of the control panel.

In an exemplary embodiment, control structures 53 (i.e., controllers) are configured to take over control functions within the web user interface 21, prepare the data to be presented in terms of their content, provide functions and data, wherein in particular data to be displayed at the request of the browsers 22, 23 are provided to the views 52.

The web server services 51 include a plurality of service components that are explained in the following (FIG. 7).

An IsMa service (infrastructure manager service) 54 serves to be able to call plugins and communicate with other IsMa services 28 at "external" systems, for example at other computers 11, 12.

Menu structures are generated and administered via a menu service 55. Menus may be dynamically reloaded at "external" systems, for example.

A push helper service 56 enables a load distribution and monitored, chronologically staggered transfer of data to "external" systems.

An RMI service 57 enables the communication between the web user interface 21 and the RMI server 33 of the control panel library module 20.

A scheduler service 58 reacts to software events and fulfills chronologically pre-planned tasks, for example a purging of a database.

The browsers 22, 23 include various browser components that are explained in detail below with reference to FIG. 8.

A (scripting) programming language module 29 serves to control the browsers 22, 23 and to control their communication with the web user interface 21. The (scripting) programming language module 59 is an interpreter or a compiler for a scripting programming language or a programming language. In the present exemplary embodiment, JavaScript is used as a scripting programming language. In principle, other (scripting) programming languages are also suitable here.

A markup language module 60 enables the interpretation and presentation of the markup language files transmitted to the browsers 22, 23, wherein the markup language serves for the structuring of digital contents (such as texts, images and hyperlinks) in electronic documents, as has already been explained above. In the present exemplary embodiment, the markup language is realized according to the "HTML5" (Hypertext Markup Language) standard, which is presently developed by the World Wide Web Consortium. In principle, other markup languages are also suitable here.

A document access interface 61 is an interface that enables access to structured electronic documents such as the markup language files transmitted to the browsers 22, 23.

Their data structure may hereby be presented in the form of a tree structure. In the present exemplary embodiment, a document access interface according to the "DOM Level 3" (Document Object Model) standard is used, which standard has been defined by the World Wide Web Consortium. In principle, other document access interfaces are also suitable here.

A design language module 62 provides a text-based design language for the formatting or declarative programming language for style templates of the structured electronic documents. The presentation of the markup language files transmitted to the browsers 22, 23 is formatted with the aid of the design language module 62. In the present exemplary embodiment, the design language is realized according to the "CSS3" (Cascading Style Sheets) standard, which has been defined by the World Wide Web Consortium. In principle, other design languages are also suitable here.

The raster computers 11 respectively comprise various software components (FIG. 9). In the present exemplary embodiment, these software components are an operating system 26, the function code 27, the infrastructure manager 28 and web user interface plugins 30, which have already been explained above.

The interface computers 12 respectively comprise various software components (FIG. 10). In the present exemplary embodiment, these software components are an operating system 26, the function code 27, the infrastructure manager 28 and web user interface plugins 30, which have already been explained above. In addition to these software components, another print group control driver 63 is present that enables the interface computer 12 to transmit print data to the print group controller 5. The print group control drivers 63 moreover provide information about the toner color printed at the respective interface computer 12 to the function code 27 of the main computer 10.

The printing system controller 4 includes various software components (FIG. 11) that are explained in the following. In an exemplary embodiment, the various software components, when executed by processor circuitry of the print system controller 4, control the print system controller 4 to perform the corresponding functions of the printing system controller 4.

In an exemplary embodiment, a main module 64 is configured to control and monitor additional software components of the printing system controller 4.

A paper transport module 65 controls the paper transport of the printing system 1 in that it controls the take-off 7a, the take-up 7b and additional drive rollers (not shown) in the print group unit 3.

Via sensors (not shown), a print group unit module 66 detects various parameters of the print group unit 3 (for example temperature, humidity, presence of paper etc.) that directly or indirectly affect the printing capability and/or the print quality. From the detected sensor data, the print group unit module 66 determines a printer status in that it evaluates the detected parameters. This evaluation occurs via a check as to whether the respective parameter values are within predetermined value ranges that define a regular operation of the print group unit 3. The printer status is transmitted to the main computer 10.

As software components, the remote control module 19 includes an operating system 26 and an SNMP (Simple Network Management Protocol) service 67 (FIG. 12). The SNMP service 67 serves for simple network communication of the remote control module 19 with other devices of the control system 2.

As software modules, the control panel computer 14 includes an operating system 26, a browser 23 and a control panel user interface 68 (FIG. 13). The control panel user interface 68 enables control panels for the operation of the control system 2 and/or of the print group unit 3 to be displayed at the control panel computer 14, and enables adjustments to be made in these control panels. The control panel user interface 68 is initialized, presented and controlled with the aid of the Java program libraries and the Java Web Start function (downloaded from the web server 36 onto the control panel computer 14), as has already been explained above.

The service computer 15, 17 includes as software components an operating system 26, a browser 23 and a service module (CoDi: Configuration and Diagnostics) 69 (FIG. 14). With the aid of the service module 69, the configuration of the control system 2 and/or of the print group unit 3 may be changed and information regarding the software diagnosis and/or hardware diagnosis may be received from the control system 2 or the print group unit 3.

In an exemplary embodiment, with reference to FIG. 2, the printing system 1 includes various computers 14, 15, 17, 18, 19 via which—using a respective control panel—adjustment jobs may be produced at the printing system 1, and/or the control system 2 and the printing system 1 and/or the control system 2 may be monitored. In particular, for these purposes, a plurality of control panel computers 14 and/or service computers 15, 17 may be connected to the control system 2.

In an exemplary embodiment, the main computer 10 is configured to generate the control panels for the connected computers 14, 15, 17, 18, 19 using the control panel module library 20 executed at the main computer 10. Each of the control panels is defined by a set of parameters and commands that may be transmitted to the computers 18, 19 and thereby may be converted into a control panel. The control panel can include a special (e.g., client specific) client program. For the computers 14, 15, 17, the set of parameters and commands that define the control panel of the respective computer 14, 15, 17 are received, together with additional information (which is explained further below), as a control panel structure by web user interface 21 and converted into the control panel file. The conversion into the control panel file thereby takes place according to a predetermined markup language. In the present exemplary embodiment, HTML5 can be used as a markup language and the control panel file is accessed with the aid of the document access interface 61. In the present exemplary embodiment, the control panel file additionally includes program code 48 that is created in JavaScript and is formatted with the aid of the design language module 62 according to its rules. The control panel file is then transferred to the respective computer 14, 15, 17 via the existing data connections.

In an exemplary embodiment, each of the browsers 22, 23 can interpret the control panel file. The control panel is hereby displayed at the user interface (GUI: graphical user interface) of the respective computer 14, 15, 17. Each control panel has at least one display object. Such a display object that serves for the display of a defined parameter, value or section of the user interface (of a menu structure, for example) is a part of the control panel and is a self-contained element of said control panel. The display objects of a control panel are independent of one another and thus may be transferred or, respectively, updated independently of one another. Typical display objects are GUI elements that correspond to a display object type, for example a list field, a button, a check box, a progress bar, a value field etc. A display object may have properties and/or present a value of a data source, for example a temperature, a switch position, a text, a graphic, a list etc. The properties can include basic properties of the display object, for example whether the display object may only be read out (read-only) or may be written to (writeable), and value-specific properties such as limit values, thresholds etc.

A data source (not shown) is a machine or device that is designed to detect or transmit data, for example a sensor (temperature sensor, revolution counter, optical sensor etc.), a switch contact, a database etc. of the printing system 1 or of the control system 2. In an exemplary embodiment, a data source transmits precisely one value (e.g. 3 degrees Celsius) with regard to a parameter (temperature, for example) at a point in time. A data source may be linked with a display object or associated with this, meaning that the display object is designed to show the value of the data source.

Each browser 23 is executed at one of the computers 14, 15, 17 in a session. In principle, what is designated by a session is a standing connection of a client computer with a server computer, wherein here the term "session" is used to the effect that a markup language file defining the control panel is executed in a browser 23 at the client computer 14, 15, 17.

The browser 22 is also executed in a session at the main computer 10, wherein here the term "session" is also used to the effect that a markup language file defining the control panel is executed in a browser 22 at the main computer 10.

In principle, data are stored as display objects within the printing system 1 or the control system 2. These display objects may have relationships with one another. Such relationships between display objects are stored as relations. For an illustrated explanation, in the following tables are used instead of describing such abstract relations.

Upon an initial connection request of one of the computers 14, 15, 17 to the main computer 10, a unique session ID is associated with the respective session via the external plugins 49. This session ID is stored in a corresponding reference table (FIG. 15) at the web user interface 21 and is transmitted from the main computer 10 to the computers 14, 15, 17. The communication between the web user interface 21 of the main computer 10 and the browsers 23 of the computers 14, 15, 17 is controlled with the session ID. The reference table is explained in detail below.

Browsers may have a presentation with multiple windows or, respectively, index cards (tabs) within the browser. Since the web user interface 21 in principle only knows one session ID, upon an initial call of the control panel in a window or, respectively, in a tab of a browser 23 the generation of a window ID (tab ID) is initiated in the web user interface 21 via the program code 48 in the browser—which program code 48 is transmitted upon being called—and said window ID is stored in the reference table at the main computer 10. The web user interface 21 may uniquely identify each window of each browser 23 via the window ID. The web user interface 21 transmits the window ID to the respective computer 14, 15, 17 so that this may be non-transiently associated with the respective window there via storage.

Every display object has a unique display object ID with which the display objects are to be uniquely identified. The display object ID is generated by the control panel module library 20 upon initialization of the respective display object for the display (meaning upon generation of a control panel) and stored in the reference table at the main computer 10. The reference table thus includes all display objects that are currently presented in all browsers 23.

The display object ID is passed via the existing data connection to the presenting browser 23 in the control panel file which defines the control panel, such that the browser 23 may likewise store the display object ID in a local data structure at the computer 14, 15, 17 and associate said display object ID with the respective display object.

Each data source has a data source ID via which the respective data source is to be uniquely identified. The data source ID is stored in the configuration of the main computer 10 upon installation of the respective data source. However, it may also be generated dynamically upon initialization of the printing system 1 and/or of the control system 2 in that the connected data sources are determined and a data source ID is automatically associated with these.

The bandwidth requirement of the corresponding data connections and the reaction times increase with the multitude of computer 14, 15, 17. A reduction of the data transferred to the computers 14, 15, 17—which data represent the display objects, display object properties and values displayed in the browser 23—as well as a distribution of the available connection capacity among the individual computers 14, 15, 17 is therefore desirable.

In order to reduce the data quantity to be transferred, a display object that displays a value is linked with the data source from which the value to be displayed results, such that—given a change of a value presented in a display object—it is possible to transfer only the changed value instead of the entire display object with the contained values.

For this, the reference table is stored and updated at the main computer 10, which reference table establishes the relation between: a display object that displays a value of a data source; a session in a browser window; and the data source from which the value originates. Via the reference table, the web user interface 21 is informed at all times about the current display objects presented in each of the browsers 23, in particular about the display objects that indicate values of data sources.

The reference table includes as entries the display object ID, the session ID, the window ID, the user ID and the data source ID. The information about a presented display object, with the session ID and the window ID of the browser 23 presenting the display object, is herein linked with the user ID of the user operating the browser 23. A data source linked with the display object is additionally specified in the event that the display object is linked with such a data source.

A web socket ID of the respective web socket 24, linked together with the session ID, may be stored in the reference table so that the web user interface 21 may determine with which session it may communicate via which web socket 24.

The reference table according to FIG. 15 is an exemplary embodiment of a data structure which describes the relationship between the individual entries. The data structure may also be of different design. In particular, instead of one table multiple sub-tables may be provided that are related to one another.

If a change occurs to a value of a data source, a value change event is generated by the respective data source with the changed value and the data source ID, which value change event is sent to the main computer 10. The main computer 10 receives the value change event in the DE agent 32, which relays this to the RMI server 33. The RMI server 33 relays the value change event to the web server services 51 of the web user interface 21. The web server services 51 then determine from the reference table all data object IDs that are linked with the data source ID, and the associated session IDs and window IDs. The web user interface 21 subsequently sends the respective window ID(s) and the respective data object ID(s) with the changed value only to the browsers 23 of the determined sessions. Every addressed browser 23 then presents the changed value in the corresponding data object in the corresponding window. The value may hereby be a number, a text, a property of the data object, a graphic etc.

A GUI change event is always triggered when a user interaction has occurred in the browser 23 that implements a change to the graphical user interface of the respective computer 14, 15, 17, for example a menu call, a web site call, a change of the focus, an entry of a parameter value into a display object etc. The GUI change event is sent from the browser 23 to the web user interface 21 and includes the session ID, the window ID, the type of action implemented in the browser 23, the data object ID of the data object connected with the change, and additional information that pertains to the data object (for example properties of the data object etc.)

In an exemplary embodiment, if the web user interface 21 receives a GUI change event, the interface 21 passes the event to the control panel module library 20. The control panel module library 20 determines from the GUI change event the data objects to be transferred to the respective computers 14, 15, 17, their data object IDs, their data object type, their properties as well as the data sources linked with them, in order to update or, respectively, change the presentation of the user interface. The control panel module library 20 transfers this information—together with the session ID, the window ID and with additional parameters and commands—as a control panel structure to the web user interface 21, which generates the control panel file from this as explained above. The web user interface 21 checks the transferred data objects and updates the reference table. The web user interface 21 hereby removes data objects that are no longer presented in the window of the browser 23 from the reference table, in that it deletes all entries of data objects that are associated with the session ID and window ID, and then adds to the reference table the new data objects that are to be presented in the window of the browser 23.

The web user interface 21 then transfers the generated control panel file to the window of the corresponding session in which the GUI change has occurred, and the receiving browser 23 presents the display objects with properties and values. For example, given a menu call the main computer 10 transmits the menu with its menu entries and their property settings to the corresponding browser 23.

In an exemplary embodiment, if a control action is taken (i.e., a value is changed or an adjustment is made that affects the printing system 1 or the control system 2) in a data object of a browser 23, then an action request is transmitted to the web user interface 21 so that the interface 21 may react accordingly.

The window ID in the reference table may also be omitted if the browser 23 is not designed to present multiple windows with different control panels, or if said browsers 23 are not executed in multiple instances at the computers 14, 15, 17 and do not display different control panels. The web user interface 21 then transfers changed values only to the individual control panel of a respective session.

The reference table at the main computer 10 may optionally include additional information as to which window of every browser 23 is active or, respectively, has focus, i.e. is displayed in the foreground and is operable. For this, the main computer 10 is informed by the client computers 14, 15, 17 about which window is active. For example, this may occur in that, with a control action or a GUI change event, a window ID is transmitted at which the GUI change or the control action has taken place, or if the user changes the focus to a window of the respective browser 23 in that he brings the window into the foreground. Given a value change event, the web user interface 21 then also takes into account the focus information from the reference table in the determination of the sessions, windows and data objects to which values are transferred. Changed values are transferred only to data objects linked with the respective data source that are presented in active windows. The data to be transferred are thereby further reduced.

In order to effectively use the connection capacity between the main computer 10 and the additional computers 14, 15, 17 that are connected with said main computer 10, combined data are transferred to the individual computers 14, 15, 17 at predetermined points in time.

The transfer of the data at the predetermined points in time is realized via a wait period after a transfer, meaning that a wait period occurs after every data transfer to a browser 23 of a session. Only after the expiration of the wait period may data be transferred to the same browser 23 again. If a value changes multiple times during the wait period, this value is thus not transferred multiple times to the browser 23, but rather only once after expiration of the wait period. This reduces the data to be transferred. Via the wait period it is also ensured that transfers to other browsers 23 may be implemented during the wait period. The wait period is generated with the aid of a timer.

What is known as an "access ticket" is used in order to ensure that the printing system 1 or the control system 2 is only operated or adjusted from one control panel. Only the user who has the access ticket may make adjustments. There is only one instance of the access ticket in the main computer 10.

The access ticket is administered by the RMI server 33. The access ticket is associated with the web user interface 21, the RMI server 33 or a connected computer 18, 19 at which the control panel is presented without browser support. The access ticket may only be associated with one of these components at a time.

In an exemplary embodiment, the control system 2 may be accessed using a control panel without the access ticket needing to be present only if the printing apparatus 1 is in a standby mode, in which the producing elements (such as the print groups) are deactivated but specific control elements are still in operation.

In an exemplary embodiment, the web user interface 21 is connected with the main computer 10. The web user interface 21 may have the access ticket and provide functionality for the operation of the printing apparatus 1 or, respectively, the control system 2 via the browser 23. Since there are multiple browsers 23 connected to the web user interface 21, a "session ticket" is provided in order to avoid conflicts as to which browsers 23 may respectively present one or more control panels in the session(s).

In an exemplary embodiment, one or more session tickets may exist in the production system. A session ticket can be logically associated with the entire production system or a portion of the production system (apparatus, device, mechanism, component, parameter) and, if possessed, authorizes a control panel to make adjustments to the entire production system or the respective part of the production system with which it is logically associated. If multiple session tickets are present for different parts of the production system, the session tickets are then uniquely logically associated with the respective part of the production system, meaning that the possession of a specific session ticket is necessary in order to be able to make a specific adjustment.

In an exemplary embodiment, the respective session ticket is assigned exclusively by the web user interface 21 and may only be associated with a browser 23 of the computer 14, 15, 17 in a session, and is linked to the respective session in which the browser 23 is executed.

In an exemplary embodiment, the web user interface 21 only receives the access ticket when the receipt of such access ticket is requested via a browser 23. If the web user interface 21 receives the access ticket, the requesting browser 23 then receives a session ticket. A browser that may adjust or, respectively, operate the printing apparatus 1 or, respectively, the control system 2 via the web user interface 21 is therefore uniquely identified. As long as the web user interface 21 has the access ticket, one of the browsers 23 may have a session ticket, and the session ticket may be withdrawn from one browser 23 and associated with a different browser 23. A hierarchically structured ticket administration with one or more subordinate session tickets and the superordinate access ticket is thus provided to avoid conflicts between control panels at different browsers. That the access ticket is associated with the web user interface 21 is a requirement for the web user interface 21 being able to assign the session ticket(s). The single exception to this is that the printing apparatus 1 is in standby mode, in which no access ticket is assigned but rather only one or more session tickets.

Browsers may have a presentation with multiple windows or, respectively, tabs within the browser, as was already explained above. This represents a problem since, although the web sockets 24, 25 and—after the initialization, i.e. after the first display of the control panel—also the session, and thus the browser 23, are identifiable, a single window opened in a browser 23 is not. In order to solve this problem, a unique window ID is respectively associated with the individual window. The session ticket is then hereby associated with the window of the session.

Given the use of windows in browsers 23, the problem results that a window is closed or is no longer capable of reacting (meaning, for example, that the embedded code has crashed), wherein in this moment the session ticket may also be associated with the window; the web user interface 21 must be informed that the respective window with the unique window ID is no longer present.

This problem is solved in that the web user interface 21 cyclically checks, using the unique window ID previously stored in the reference table, whether the window is still open and capable of reacting. For this, the web user interface 21 sends a request to report to (ping) the embedded program code 48 of all windows of the browser 23 that are known to the web user interface 21 in all browsers 23 in all sessions. The web user interface 21 expects an echo from the embedded program code 48 as a response (which embedded program code 48 is executed in the respective window of the browser 23) with the unique ID of the window. If this response with the unique window ID is absent after a predetermined wait time, the web user interface 21 removes this unique window ID from the reference table. It is thereby ensured that windows that are closed or no longer capable of reacting are removed from the reference table.

If a window that is no longer open or capable of reacting has owned a session ticket, the web user interface 21 may decide how to further proceed. There are multiple possibilities for this that are explained in detail below:

1. The now released session ticket is automatically assigned to another window of the same browser 23 that previously had the session ticket, in the event that the browser 23 is active in the corresponding session and presents a control panel for the printing apparatus 1 or the control system 2 (same user, same session, same browser 23).

2. The now released session ticket is assigned to another browser 23 of the user that previously had the session ticket, in the event that another browser 23 is active within the corresponding session and presents a control panel (same user, same session, different browser 23).

3. The now released ticket is assigned to another browser 23 of the same user who had the session ticket, wherein the browser 23 runs in another session, in the event that such a browser 23 is active in another session and presents a control panel (same user, different session, different browser 23).

4. The now released session ticket is assigned to another user who is possibly selected according to a user priority. For example, the users are prioritized according to when they have sent a request for a session ticket, wherein the newest or oldest request may have a higher priority (different user, different session, different browser 23).

5. The now released session ticket is passed into a waiting area or, respectively, a waiting pool for a new request of the session ticket, and thus is returned to the web user interface 21.

In an exemplary embodiment, if a browser is used that allows only a single window, then window IDs are not necessary. Instead of the window ID, the session ID may then be cyclically monitored, wherein given a browser that is no longer open or a browser that is no longer capable of reacting, the session ticket is assigned or, respectively, withdrawn similar to the above description.

In an exemplary embodiment, a browser buffer is maintained at the main computer for each active browser. The browser buffer serves to buffer the data that should be passed to the respective browser 23 or its window, for example markup language files, display object data, values etc., and is associated with precisely one browser 23 with the aid of the session ID and possibly window ID.

In an exemplary embodiment, with reference to FIG. 15, to synchronize control panels of the production system with one another, the reference table is expanded with further entries (such as a control panel ID and a synchronization information) in addition to the entries explained above.

The control panel ID represents a unique identification of a control panel that is opened in a browser 23 or in a window of a browser 23. The control panel ID simplifies referencing the respective control panel for the synchronization of control panels, in particular if the browser 23 has windows, since the respective window is then referenced via the combination of two identification designators (namely the session ID and the window ID). If the browser 23 that is used has no windows, the control panel shown in the browser 23 may then also alternatively be uniquely referenced via the session ID so that the control panel ID may also be omitted.

The synchronization information that is associated with the control panel provides the information of whether the control panel:

is an independent control panel ("Single" operating mode)—the control panel has not participated in a synchronization, is a control panel synchronized with another control panel ("Synchronized" operating mode), or is a synchronizing control panel—the control panel synchronizes at least one other control panel ("Synchronizing" operating mode).

If the respective control panel is in the "Single" operating mode, the entry for the corresponding synchronization information is blank.

If the respective control panel is in the "Synchronized" operating mode, the corresponding synchronization information then includes the control panel ID of the control panel with which the synchronized control panel is synchronized.

The control panel ID that may be stored in the synchronization information may thus be regarded as "is synchronized with".

If a control panel is in the "Synchronized" operating mode, changes to the other control panel or to its display objects with which the control panel is synchronized are communicated to this control panel. This operating mode represents the simplest operating mode for a synchronization since the changes that a user executes at a display object of a control panel are hereby simply transmitted from the one control panel to other control panels synchronized with it, without review of additional parameters. The transmission of the changes thereby takes place in each direction between the control panels synchronized with one another.

If the respective control panel is in the "Synchronizing" operating mode, the entry for the corresponding synchronization information may be blank or may include a dummy entry that indicates that the control panel is a synchronizing control panel. Given a synchronizing control panel, the synchronization relationship between control panels is represented by a blank entry in the reference table. In this example, the synchronizing control panel in which the respective synchronized control panel is synchronized can be entered at the synchronized control panels. Given a synchronizing control panel, a dummy entry in the synchronization information enables a quick location of a synchronizing control panel in the reference table.

A hierarchical relationship between a synchronizing control panel and one or more synchronized control panels that are synchronized with the synchronizing control panel is formed by a blank entry or an entry of a dummy value in the synchronization information of the respective synchronizing control panel. A synchronization direction between control panels is thereby unambiguously provided.

A browser 23 that shows a synchronizing control panel is hereby designated as a synchronizing browser 23a, and a browser 23 that shows a synchronized control panel is hereby designated as a synchronized browser 23b. It is exclusively changes to the control panel of the synchronizing browser 23a that are transmitted from the web user interface 21 to the synchronized browser 23b, and thus the synchronization direction is established.

Since the control panel ID (which may be stored in the synchronization information) may be regarded as "is synchronized with", as explained above, control panels can therefore also be synchronized that are synchronized without a specification of the synchronization direction or without a hierarchical relationship with one another. For this, the control panel ID of the other control panel is entered into the synchronization information of the respective control panel. A change to one of the two control panels is automatically synchronized to the other control panel.

In an exemplary embodiment, a "1:N" relationship between a synchronizing control panel and one or more control panels synchronized with the synchronizing control panel, as well as a "1:1" relationship between two control panels synchronized with one another, can thus be represented via the use of the reference table explained above that includes the control panel ID and the synchronization information.

In an exemplary embodiment, a synchronization between different control panels is usable for the following operating situations (but are not limited to):
- a user who remains at different locations of the production system that are provided with control panels—for example for a check of the production product and/or a parameterization of the production system—can find the same, current control panel in front of them at the different control panels that they use,
- if multiple users are provided who are authorized to adjust parameters at the production system and make such adjustments, the control panels of the other users may be displayed, synchronized, to each of these users in the event that the user has the corresponding user rights for the display of these synchronized control panels, whereby the user may be informed about the adjustment processes of the other users (this applies in the event that multiple session tickets for individual parts of the production system are present at the production system), or
- in a professional training activity at the production system, a user who takes on the role of a teacher may demonstrate operating processes at the production system to another user who takes on the role of a student, in that the control panel of the teacher (as a synchronizing control panel) synchronizes the control panel of the student (as a synchronized control panel).

The actions requested from a control panel include menu actions that may change the interface of the control panel, and/or synchronization adjustment actions with which synchronization adjustments for the control panel may be changed, and/or control actions with which adjustments to the production system may be modified.

The methods explained below assume that the reference table is maintained and updated at the main computer 10, and that browser buffers for the transfer of the data to the active browser or browsers are present, as explained above.

The methods explained in below are explained for control panels that are displayed in browsers 23a, 23b. However, the methods can also be implemented for the synchronization of control panels that are displayed in windows of such browsers 23a, 23b, and/or of individual display objects that are shown in the displayed control panels.

FIG. 16 illustrates a method to synchronize control panels of a production system (e.g., a printing system) according to an exemplary embodiment of the present disclosure.

The method begins in step S1. In step S2, the web user interface 21 checks whether it has received an action request from one of the control panels of an active browser 23. Each action request transmitted from a control panel to the web user interface 21 can include information that identifies the requesting control panel or the requesting browser 23. A session ID, a window ID, a web socket ID, a display object ID, a control panel ID or a combination of these identification designators may be used to ensure such an identification.

If the web user interface 21 has received in step S2 an action request from one of the control panels of an active browser 23, the execution of step S3 follows, in which the web user interface 21 checks whether the action-requesting control panel is a synchronizing control panel. A synchronizing control panel is a control panel to which at least one other control panel is synchronized. The web user interface 21 accesses the synchronization information in the reference table for the check of whether the requesting control panel is a synchronizing control panel. The synchronization information indicates whether a control panel is a synchronized control panel in that the control panel ID or another designator of the synchronizing control panel that identifies the respective control panel is entered. As explained above, whether the respective control panel is a synchronizing control panel may additionally be entered into the synchronization information.

If the web user interface 21 has established in step S3 that the action-requesting control panel is a synchronizing control panel, the method workflow then continues with the execution of step S4, in which the web user interface 21 determines the synchronized control panels that are associated with the synchronizing control panel (i.e., the control panels that are synchronized with the synchronizing control panel). The web user interface 21 can make this determination based on the synchronization information in the reference table.

The execution of step S5 then follows, in which a new markup language file that has the change that has occurred in the synchronizing control panel is generated for one of these synchronized control panels. The markup language file can be stored in a browser buffer at the main computer 10. The browser buffer is associated with the respective synchronized browser 23b that displays the associated synchronized control panel.

Step S6 is then executed in that the web user interface 21 transmits an event (e.g., a push event) as change information to the respective synchronized browser 23b. Upon receiving the event, this synchronized browser 23b reads the markup language file out from the browser buffer that is associated with it and executes said markup language file to display the control panel.

In the step S7 that follows from this, the web user interface 21 checks whether an additional synchronized control panel is present that is associated with the synchronizing control panel. If so, the method workflow returns to step S5 for the additional control panel.

If the web user interface 21 establishes in step S7 that no additional synchronized control panel is present that is associated with the synchronizing control panel, step S8 is then executed.

In step S8, a markup language file is generated for the action-requesting control panel that should be displayed in the corresponding browser 23. This markup language file has the change to the action-requesting control panel according to the action request. The markup language file is stored in a browser buffer that is associated with the browser 23 that represents the action-requesting control panel.

Step S9 is then executed, in which the web user interface 21 transmits am event (e.g., a push event) as change information to the browser 23 that represents the action-requesting control panel. Upon receiving the event, this browser 23 reads out the markup language file from the browser buffer associated with it and executes this to display the control panel.

The execution of step S10 then follows, in which a check is made as to whether the operation is to be continued. If the operation is not to be continued, step S11 then follows in which the method ends. However, if the operation is to be continued, after the execution of step S10 the method workflow returns to step S2.

If it is established in step S2 that no action request has been received from a control panel, the method workflow passes directly to step S10.

If it is established in step S3 that the action-requesting control panel is not a synchronizing control panel, the method workflow passes directly to step S8. An action-requesting control panel that is not a synchronizing control panel is either a synchronized control panel or a control panel that is neither synchronized nor synchronizing, meaning that it does not participate in any synchronization relationship.

In an exemplary embodiment, after it has been established in step S3 that the action-requesting control panel is not a synchronizing control panel, step S12 may be executed in which the web user interface 21 checks whether the action-requesting control panel is a synchronized control panel. If so, the method workflow then passes to step S10.

If, in step S12, it is established that the action-requesting control panel is not a synchronized control panel (thus is a control panel that is not participating in a synchronization relationship), the execution of step S8 then follows.

Via step S12, action requests from synchronized control panels and the changes to these control panels that are connected with these panels are blocked. Only action requests from synchronizing control panels or control panels that participate in no synchronization relationship are thus processed.

With the method explained above with reference to FIG. 16 for the synchronization of control panels of a production system (e.g., a printing system), given change requests from control panels, the respective control panel is changed and other control panels that are synchronized with the control panel requesting the action are likewise changed in order to keep the control panels synchronized with one another.

FIG. 17 illustrates an expanded method to synchronize control panels of a production system (e.g., a printing system) according to an exemplary embodiment of the present disclosure. The expanded method more significantly exhibits the differentiation of the requested actions relative to the method explained above.

The method begins in step S20. In step S21, a check is made as to whether an action request has been received from a control panel.

If so, step S22 is executed in that a check is made as to whether a synchronization adjustment action has been requested by the action-requesting control panel. Adjustments to the synchronization of the respective control panel are made with a synchronization adjustment action.

If the requested action is not a synchronization adjustment action, step S23 is then executed, in which a check is made as to whether the requested action is a control action. Change of control parameters for a portion of or the entire production system are implemented with a control action.

If it is established in step S23 that a control action has been requested, step S24 is then executed in that a check is made as to whether the action-requesting control panel has a corresponding session ticket with which the control panel is authorized to change control parameters for a portion of or the entire production system. By assigning the session ticket only to unsynchronized control panels, it may be ensured that only control actions from synchronizing control panels or control panels that do not participate in any synchronization relationship are processed.

If it is established in step S24 that the action-requesting control panel has a corresponding session ticket, step S25 is then executed, in which the control action requested by the control panel is executed at the main computer 10.

In the following step S26, a modified markup language file is generated for the browser 23 that shows the requesting control panel. This markup language file can be stored at the main computer 10 in a browser buffer that is associated with this browser 23; and a push event is transmitted to this browser 23 as change information. Upon receiving the push event, the browser 23 reads the markup language file from the browser buffer associated with it and executes this to display the action-requesting control panel. The modified markup language file has the changes to be made at the action-requesting control panel. These actions executed in step S26 correspond to the actions of the method explained above with reference to FIG. 16 that are executed in method steps S8 and S9.

Step S27 is then executed in which it is checked whether the action-requesting control panel is a synchronizing control panel. As explained above, this can be determined using the synchronization information in the reference table.

If it is established in step S27 that the action-requesting control panel is a synchronizing control panel, step S28 is executed. At step S28, the associated control panels synchronized with the synchronizing control panel are determined; the modified markup language files for these associated synchronized control panels are generated and stored in corresponding browser buffers at the main computer 10 that are respectively associated with the synchronized browsers 23b that display the synchronized control panels; and the corresponding push events are transmitted as change information to these browsers 23b. These actions executed in step S28 correspond to the actions of the method explained above with reference to FIG. 16 that are executed in method steps S4 through S7.

The execution of step S29 then follows, in which a check is made as to whether the operation is to be continued. If the operation is not to be continued, step S30 then follows, in which the method ends. However, if the operation is to be continued, the method workflow passes to step S21 after the execution of step S29.

If it is established in step S21 that no action request has been received from a control panel, the method workflow then passes directly to step S29.

If it is established in step S22 that the requested action is a synchronization adjustment action, the execution of step S31 then follows in which the synchronization adjustment action is executed at the main computer 10 for the requesting control panel. This means that all synchronization adjustment actions are executed independently of the type of requesting control panel.

After execution of step S31, step S32 is executed, in which markup language files for the control panels with changes to their synchronization settings are generated; the modified markup language files are stored in the browser buffers that are associated with the respective browsers 23 that display these control panels; and the corresponding push events are transmitted to the respective browsers 23.

After execution of step S32, the method workflow passes to step S29.

If it is established in step S23 that the requested action is not a control action—thus that the requested action is a menu action with which the interface of the control panel may be changed—step S33 is then executed, in which a check is made as to whether the control panel requesting the menu action is a synchronized control panel.

If it is established in step S33 that the control panel requesting the menu action is a synchronized control panel, the method workflow then passes directly to step S29. The execution of menu actions of synchronized control panels is thereby blocked.

If it is established in step S33 that the control panel requesting the menu action is not a synchronized control panel, the execution of step S34 follows, in which the requested action is executed at the main computer 10. It is thereby ensured that only menu actions of synchronizing control panels or control panels that do not participate in any synchronization relationship are processed.

After the execution of step S34, the method workflow passes to step S26.

If it is established in step S24 that the control panel requesting the control action does not possess the session ticket, the method workflow then passes directly to step S29. It is thereby ensured that control panels that request control actions possess the session ticket authorized for requesting the control action.

If it is established in step S27 that the action-requesting control panel is not a synchronizing control panel, the method workflow then passes directly to step S29. It is thereby ensured that markup language files for the associated synchronized browsers 23b are generated only given an action-requesting control panel that is a synchronizing control panel, and that the corresponding change information is transmitted to these browsers 23b.

Alternatively, in step S24 it may additionally be checked whether the control panel requesting the control action is not a synchronized control panel and—if this is the case—step S25 is executed; otherwise, the method workflow passes directly to step S29.

With the expanded method explained above for the synchronization of control panels of a production system (e.g., a printing system), control panels are modified depending on the actions requested by them at the main computer 10 and are synchronized with one another under consideration of the synchronization information entered in the reference table.

Alternatively, the methods explained above for synchronization of control panels of a production system may be expanded such that the web user interface 21 stores the focus information (which is transferred with a GUI change event) in the reference table and takes it into account as well in the synchronization of the control panel of the respective browser 23. For example, the storage in the reference table may occur in that the web user interface 21 enters "true" in the focus information of the display objects that have focus or are displayed in the foreground, and "false" is entered in the focus information of all other display objects, meaning all display objects that do not have focus or are not displayed in the foreground. The consideration of the focus information for the synchronization is advantageous in particular given browsers 23b that show synchronized control panels wherein the synchronized control panel or the synchronized browser 23b does not have focus or is not located in the foreground. In such a case, no synchronization of the control panel occurs. Only if the control panel receives focus or is moved into the foreground is the control panel synchronized again. The transmitted data amount is thereby further reduced.

In the exemplary embodiments explained above, tables are used as data structures. These tables are examples. The tables may also be structured differently, wherein tables are divided up into multiple tables or multiple tables are merged into a common table, or specific parameter sets are stored in a different table. It should be appreciated that the relationships or relations of the parameters used in the exemplary embodiments relative to one another can be maintained in other data structures. For example, instead of tables, any other data structures may also be used, including, for example, databases, lists or hierarchical data structures (tree structures, for example).

In one or more exemplary embodiments, one or more of the method steps explained with reference to the browser 23 may also be executed for or with the browser 22 at the main computer 10.

In one or more exemplary embodiments, the methods explained above may be implemented for the synchronization of control panels that are displayed in windows of browsers 23 and/or for the synchronization of individual display objects that are shown in the displayed windows.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, processor circuitry can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 printing system
2 control system
3 print group unit
4 printing system controller
5 print group controller
6 print group
7a take-off
7 take-up
8 print server
9 internal LAN
10 main computer
11 raster computer
12 interface computer
13 optical waveguide
14 control panel computer
15 service computer
16 router
17 service computer
18 printer control panel computer
19 remote control module
20 control panel library module
21 web user interface
22 browser
23 browser
24 web socket
25 web socket
26 operating system
27 function code
28 infrastructure manager
29 web user interface database
30 web user interface plugins
31 trace module
32 DE agent
33 RMI server
34 ORS agent
35 trace agent
36 web server module
37 system parameter manager
38 SEA agent
39 OP master
40 UIC agent
41 TR file collector
42 Ops-PAC
43 RDP agent
44 error agent
45 CDC agent
46 web server
47 framework
48 program code
49 external plugins
50 external libraries
51 web server services
52 views
53 controllers
54 IsMa service
55 menu service
56 push helper service
57 RMI service
58 scheduler service
59 (scripting) programming language module
60 markup language module
61 document access interface
62 design language module
63 print group control driver
64 main module
65 paper transport module
66 a print group unit module
67 SNMP service
68 control panel user interface
69 service module
111, 111a-111d print group (front side)
112, 112a-112d print groups (back side)
120 recording medium
121 roll (input)
123 conditioning group
124 turner
125 register
126 drawing plant
128 roll (output)
130 fixer
140 climate control module
150 power supply
170 fluid management
171 fluid control
172 reservoir

What is claimed is:

1. A method for synchronization of multiple control panels of a production system, the method comprising:
executing a browser on one or more client computers connected via a data connection to a main computer of a control system of the production system, the main computer including a browser buffer for each active browser;
executing a control panel module library installed at the main computer to generate and provide a control panel for the production system, the control panel being transmitted as a markup language file from the main computer to the respective browser and executed in the browser to display the control panel, wherein the markup language file currently stored in the browser buffer is overwritten with a modified markup language file;
transmitting the markup language file from the main computer to one of the one or more client computers using a web user interface installed and executed at said main computer, the markup language file stored in the browser buffer being transmitted in segments to the respective browser associated with the browser buffer, wherein pauses are inserted between transmission of successive file segments to the respective browser, and file segments of markup language files are transmitted in the inserted pauses to at least one other browser as needed;

transmitting, from the main computer and using the web user interface, change information to a control panel of a respective client computer of the one or more client computers if the control panel of the respective client computer has changed, the change information describing a change to the respective client computer's control panel of the multiple control panels;

maintaining a reference table at the main computer that includes one or more relationships established between the respective control panels to be synchronized;

upon transmission of the change information, checking, using the web user interface whether an additional control panel of the multiple control panels is to be synchronized with the control panel of the multiple control panels based on the reference table; and if the additional control panel of the multiple control panels is to be synchronized, transmitting, using the web user interface, the respective change information to the additional control panel.

2. The method according to claim 1, wherein:

the browser that displays the control panel is executed at a corresponding client computer in a session that is an existing connection of the corresponding client computer with the main computer, and the web user interface is configured to use a session ID to identify the respective control panel, the session ID being a unique identification designator for the respective session and being stored in the reference table.

3. The method according to claim 1, wherein:

the browser is configured to open multiple windows in which control panels may be displayed, each of the multiple windows being associated with a window ID that is an identification designator for the respective browser window, and the web user interface being configured to use the window IDs to identify the respective control panel displayed in the browser window.

4. The method according to claim 1, wherein:

the relationship that is established in the reference table between the respective control panels to be synchronized is formed as a hierarchical relationship, the method further comprises establishing one of the multiple control panels as a synchronizing control panel and establishing one or more other control panels of the multiple control panels as control panels synchronized with the synchronizing control panel, and the web user interface is configured to exclusively change the one or more synchronized control panels given one or more changes to the synchronizing control panel.

5. The method according to claim 1, wherein the change information comprises a reference to a markup language file.

6. The method according to claim 1, wherein:

the main computer is configured to execute one or more predetermined actions based on an action request generated by one of the multiple control panels, and the web user interface is configured to transmits change information to the one of the multiple control panel having generated and provided the action request based on a specification of the action request.

7. The method according to claim 6, wherein the web user interface is configured to:

assign one or more session tickets to a control panel of the multiple control panels according to predetermined rules, the one or more session tickets authorizing the assigned control panel to change one or more of the multiple control panels using a request of a control action for a portion of production system or the entire production system, and upon receiving the request for the control action, check whether the requesting control panel possesses the session ticket authorized for execution of the control action, the web user interface only executing the control action if the session ticket is present.

8. The method according to claim 6, wherein the web user interface is configured to:

make adjustments to the synchronization of the control panels, the adjustments being requested by the multiple control panels using a request for a synchronization adjustment action, the web user interface executing only the requested synchronization adjustment actions from each of the synchronized control panels.

9. The method according to claim 1, wherein:

given a change to a control panel of the multiple control panels, extracting, by the web user interface, an identification of control panels to be synchronized with one another, users of the corresponding control panels, one or more sessions of the corresponding control panels and/or windows of the corresponding control panels, using, by the web user interface, the identification to identify the users of the control panels, determining, by the web user interface, user rights associated with a respective user, checking, by the web user interface using the determined user rights, whether the control panels may be synchronized with one another, and transmitting, by the web user interface and based on the checking, change information to a synchronized control panel if the control panels may be synchronized.

10. The method according to claim 1, wherein:

each control panel comprises one or more display objects that are respectively a self-contained element of the control panel and form a display of the control panel, given a change to one of the multiple control panels or its display objects, extracting, by the web user interface, an identification of control panels to be synchronized with one another, users of the control panels to be synchronized, one or more sessions of the control panels to be synchronized, and/or windows of the control panels to be synchronized, using, by the web user interface, the identification to identify the users of the control panels, determining, by the web user interface, the user rights associated with a respective user, checking, by the web user interface using the determined user rights, whether the respective display object may be synchronized between the control panels, and transmitting, by the web user interface and based on the checking, change information regarding the respective display object to the synchronized control panel of the control panels may be synchronized.

11. The method according to claim 1, wherein:
each control panel comprises one or more display objects that are respectively a self-contained element of the control panel and form a display of the control panel, and
given a change to a display object, transmitting, by the web user interface, change information that describes the change to the display object to synchronized control panels.

12. The method according to claim 1, wherein:
each control panel comprises one or more display objects that are respectively a self-contained element of the control panel and form a display of the control panel, and
given a change to a display object, the changed display object is updated independently of other display objects of the display objects.

13. The method according to claim 1, wherein:
each control panel comprises one or more display objects that are respectively a self-contained element of the control panel and that form a display the control panel, and
given a change to a display object, the changed display object is synchronized only after expiration of a predetermined wait period since a last synchronization of the control panel or of one of the display objects of the control panel.

14. The method according to claim 13, wherein the predetermined wait period is 0.1 seconds to 10 seconds.

15. The method according to claim 1, wherein:
the reference table comprises information identifying, for each control panel:
whether the browser displaying the control panel or a window of the browser displaying the control panel is displaying the control panel in a foreground, and/or
whether a focus marking the browser or a window of a browser as active is on the browser or the window of the browser, and
given a change to control panels, the web user interface transmits the change information only to the control panels that are shown in the foreground, have focus and/or receive focus.

16. The method according to claim 1, wherein the web user interface and the respective browser displaying the control panel are configured to communicate using web sockets, an additional web socket of one of the web sockets being coupled to the web user interface and to the browser such that a permanent data connection is formed between the web user interface and the respective browser.

17. The method according to claim 1, wherein:
the transmission of the change information via the web user interface comprises transmitting a push event to the corresponding browser, and
receipt of the push event induces the corresponding browser to request a prepared markup language file from the main computer and to execute the received prepared markup language file to display the control panel.

18. The method according to claim 1, wherein the production system is a printing system.

19. A control system for a production system, the control system comprising:
a main computer connected via a data connection with one or more client computers at which a browser is installed and executable, the main computer including a control panel module library is installed and executable on the main computer, wherein the control panel module library is configured to generate and provide a control panel for the production system, the control panel being transmitted as a markup language file from the main computer to the respective browser and executed in the browser to display the control panel,
wherein the control system is configured to perform the method according to claim 1.

20. A method for synchronization of multiple control panels of a production system, the method comprising:
executing a browser on one or more client computers connected via a data connection to a main computer of a control system of the production system;
executing a control panel module library installed at the main computer to generate and provide a control panel for the production system, the control panel being transmitted as a markup language file from the main computer to the respective browser and executed in the browser to display the control panel;
transmitting the markup language file from the main computer to one of the one or more client computers using a web user interface installed and executed at said main computer;
transmitting, from the main computer and using the web user interface, change information to a control panel of a respective client computer of the one or more client computers if the control panel of the respective client computer has changed, the change information describing a change to the respective client computer's control panel of the multiple control panels;
maintaining a reference table at the main computer that includes one or more relationships established between the respective control panels to be synchronized;
upon transmission of the change information, checking, using the web user interface whether an additional control panel of the multiple control panels is to be synchronized with the control panel of the multiple control panels based on the reference table; and
if the additional control panel of the multiple control panels is to be synchronized, transmitting, using the web user interface, the respective change information to the additional control panel, wherein:
the reference table comprises information identifying, for each control panel:
whether the browser displaying the control panel or a window of the browser displaying the control panel is displaying the control panel in a foreground, and/or
whether a focus marking the browser or a window of a browser as active is on the browser or the window of the browser, and
given a change to control panels, the web user interface transmits the change information only to the control panels that are shown in the foreground, have focus and/or receive focus.

21. A method for synchronization of multiple control panels of a production system, the method comprising:
executing a browser on one or more client computers connected via a data connection to a main computer of a control system of the production system;
executing a control panel module library installed at the main computer to generate and provide a control panel for the production system, the control panel being transmitted as a markup language file from the main computer to the respective browser and executed in the browser to display the control panel;

transmitting the markup language file from the main computer to one of the one or more client computers using a web user interface installed and executed at said main computer;

transmitting, from the main computer and using the web user interface, change information to a control panel of a respective client computer of the one or more client computers if the control panel of the respective client computer has changed, the change information describing a change to the respective client computer's control panel of the multiple control panels;

maintaining a reference table at the main computer that includes one or more relationships established between the respective control panels to be synchronized;

upon transmission of the change information, checking, using the web user interface whether an additional control panel of the multiple control panels is to be synchronized with the control panel of the multiple control panels based on the reference table; and if the additional control panel of the multiple control panels is to be synchronized, transmitting, using the web user interface, the respective change information to the additional control panel, wherein:

each control panel comprises one or more display objects that are respectively a self-contained element of the control panel and that form a display the control panel, and given a change to a display object, the changed display object is synchronized only after expiration of a predetermined wait period since a last synchronization of the control panel or of one of the display objects of the control panel, the predetermined wait period being 0.1 seconds to 10 seconds.

* * * * *